US009102800B2

(12) United States Patent
Allen et al.

(10) Patent No.: US 9,102,800 B2
(45) Date of Patent: Aug. 11, 2015

(54) POLYCARBONATE BLOCK COPOLYMERS

(71) Applicant: Novomer, Inc., Ithaca, NY (US)

(72) Inventors: Scott D. Allen, Ithaca, NY (US); Chris A. Simoneau, Trumansburg, NY (US); John M. Salladay, Carmel, IN (US); David M. Hatfield, Midland, MI (US); John W. Stevens, Gainesville, FL (US)

(73) Assignee: Novomer, Inc., Ithaca, NY (US)

( * ) Notice: Subject to any disclaimer, the term of this patent is extended or adjusted under 35 U.S.C. 154(b) by 0 days.

(21) Appl. No.: 14/333,484

(22) Filed: Jul. 16, 2014

(65) Prior Publication Data

US 2015/0166734 A1 Jun. 18, 2015

Related U.S. Application Data

(63) Continuation of application No. 14/040,121, filed on Sep. 27, 2013, now Pat. No. 8,785,591, which is a continuation of application No. 13/126,607, filed as application No. PCT/US2009/062871 on Oct. 30, 2009, now Pat. No. 8,580,911.

(60) Provisional application No. 61/110,567, filed on Nov. 1, 2008.

(51) Int. Cl.
  *C08G 64/00* (2006.01)
  *C08G 81/00* (2006.01)
  *C08G 63/02* (2006.01)

(52) U.S. Cl.
  CPC ..................... *C08G 81/00* (2013.01)

(58) Field of Classification Search
  CPC .................................... C08G 64/307
  USPC ................................. 528/196, 198
  See application file for complete search history.

(56) References Cited

U.S. PATENT DOCUMENTS

| | | | |
|---|---|---|---|
| 3,984,333 A | 10/1976 | van de Kraats et al. |
| 4,480,696 A | 11/1984 | Almond et al. |
| 4,665,136 A | 5/1987 | Santangelo et al. |
| 4,921,635 A | 5/1990 | Enick |
| 5,566,470 A | 10/1996 | Morrison |
| 6,686,438 B1 | 2/2004 | Beckman et al. |
| 6,870,004 B1 | 3/2005 | Nguyen et al. |
| 7,304,172 B2 | 12/2007 | Coates et al. |
| 8,247,520 B2 | 8/2012 | Allen et al. |
| 8,470,956 B2 | 6/2013 | Allen et al. |
| 8,580,911 B2 | 11/2013 | Allen et al. |
| 8,604,155 B2 | 12/2013 | Allen et al. |
| 8,785,591 B2 | 7/2014 | Allen et al. |
| 2005/0215438 A1 | 9/2005 | Prud'homme et al. |
| 2006/0223973 A1 | 10/2006 | Hinz et al. |
| 2008/0243049 A1 | 10/2008 | Hardy |
| 2011/0152497 A1 | 6/2011 | Allen et al. |
| 2013/0144031 A1 | 6/2013 | Allen et al. |
| 2013/0144032 A1 | 6/2013 | Allen et al. |
| 2013/0144033 A1 | 6/2013 | Allen et al. |

FOREIGN PATENT DOCUMENTS

| | | |
|---|---|---|
| WO | WO-00/35998 A2 | 6/2000 |
| WO | WO-2008136591 A1 | 11/2008 |
| WO | WO-2008150033 A1 | 12/2008 |
| WO | WO-2009137540 A1 | 11/2009 |
| WO | WO-2010/022388 A2 | 2/2010 |
| WO | WO-2010/028362 A1 | 3/2010 |

OTHER PUBLICATIONS

Bertozzi, C.R. and Bednarski, M.D., The Synthesis of Heterobifunctional Linkers for the Conjugation of Ligands to Molecular Probes, Journal of Organic Chemistry, 56(13):4326-4329 (1991).
International Preliminary Report in Patentability for PCT/US09/62871 completed Aug. 19, 2011, and mailed Jun. 11, 2012.
International Search Report for PCT/US2009/062871 mailed Jan. 22, 2010.

*Primary Examiner* — Terressa Boykin
(74) *Attorney, Agent, or Firm* — Choate, Hall & Stewart, LLP; Charles E. Lyon; John P. Rearick

(57) ABSTRACT

The disclosure pertains to amphiphilic block copolymers comprising an aliphatic polycarbonate chain coupled to a hydrophilic polymer. Such amphiphilic polymers may have the formula A-L-B, where A- is a polycarbonate or polyether-carbonate chain having from about 3 to about 500 repeating units, L is a linker moiety and -B is a hydrophilic oligomer having from about 4 to about 200 repeating units. Provided copolymers are useful as surfactants capable of emulsifying aqueous solutions and supercritical carbon dioxide. Provided copolymers also have utility as additives for use in enhanced oil recovery methods.

25 Claims, 6 Drawing Sheets

POLYCARBONATE BLOCK COPOLYMERS

PRIORITY CLAIM

This application is a continuation of U.S. Pat. No. 8,785,591, which is a continuation of a U.S. Pat. No. 8,580,911, which is U.S. national phase application under 35 U.S.C. §371 of PCT application no. PCT/US09/62871, filed Oct. 30, 2009, which claims priority to U.S. Provisional Patent Application Ser. No. 61/110,567, filed Nov. 1, 2008. The entire contents of this priority application is incorporated herein by reference.

BACKGROUND

Carbon dioxide is of great interest as a solvent in chemical processing because it is non-flammable, relatively non-toxic, and naturally abundant. These "green" properties have prompted the development of a host of new applications for $CO_2$, some of which were made possible by the discovery of functional groups that enable miscibility of various moieties with $CO_2$ at moderate pressures. Development of $CO_2$ surfactants, for example, allows for processes such as emulsion polymerization or dry cleaning with $CO_2$.

$CO_2$ has been extensively employed to recover oil from underground formations, as it is inexpensive, non-flammable, relatively non-toxic and remediation is not required. In enhanced oil recovery (EOR), a flooding agent is pumped into the oil-bearing formation to move the petroleum to exit wells (see for example U.S. Pat. Nos. 4,480,696, 4,921,635 and 5,566,470). Water is most often used as the flooding agent, yet intimate contact between petroleum and water creates cross-contamination that mandates remediation of large volumes of organic-contaminated water. Indeed, a life cycle analysis of polystyrene performed during the 1980's suggested that the extraction of petroleum from the ground produces more liquid waste than any other process step over the entire cradle-to-grave lifespan of the material. Carbon dioxide would be a more sustainable flooding agent than water, but the viscosity of $CO_2$ is too low to efficiently recover petroleum from the formation. Rather than sweep the oil before it, carbon dioxide "fingers" its way through the petroleum and hence leaves most of the oil behind.

Researchers in the petroleum engineering field have tried for decades to design additives that can raise the viscosity of carbon dioxide (at low concentration) to levels that would render $CO_2$-flooding more practical, but success has been elusive. Additives have been synthesized that enhanced the viscosity of simple hydrocarbons, yet which were not soluble in $CO_2$ without the use of impractically high fractions of co-solvent. Other additives have been identified that were $CO_2$-soluble but which did produce any changes in the viscosity of $CO_2$.

Polymer-based surfactants have also been developed for use in increasing the viscosity of $CO_2$ and/or $CO_2$ solubility (WO 00/35998 and U.S. Pat. No. 6,686,438). However, these materials have not found much practical utility due to issues with their relative solubility in $CO_2$ and water, specifically in their tendency to be hydrophilic but not very $CO_2$-philic.

Improvement in the efficiency of $CO_2$-flooding will promote the use of $CO_2$ over water in EOR and thus reduce the volume of liquid waste produced during petroleum extraction. Use of $CO_2$ in EOR also results in its sequestration in rock formations, potentially an important part of an overall $CO_2$ sequestration strategy. Thus, what is at first glance simply a technical problem in petroleum engineering has significant environmental ramifications as well. This discussion highlights the need for compositions that increase the viscosity of fluids comprising supercritical $CO_2$ and water.

SUMMARY OF THE INVENTION

The present disclosure provides, among other things, amphiphilic polymers having the formula A-L-B, wherein each of A, L, and B is as defined and described in classes and subclasses herein.

In some embodiments, the present disclosure provides amphiphilic polymers having the formula A-B-A, wherein each of A and B is as defined and described in classes and subclasses herein.

In some embodiments, the present disclosure provides methods to make polymers of formula A-L-B or A-B-A.

In certain embodiments, provided copolymers are surfactants capable of compatibilizing aqueous solutions and supercritical carbon dioxide. In certain embodiments, provided copolymers are viscosity modifiers capable of increasing the viscosity of supercritical carbon dioxide mixtures. In certain embodiments, provided copolymers have utility as additives for use in enhanced oil recovery methods. In certain embodiments, provided copolymers are useful for forming polymersomes.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, an stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms. In some embodiments, aliphatic groups contain 1-4 carbon atoms. In some embodiments, aliphatic groups contain 1-3 carbon atoms. In some embodiments, aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or bicyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring. In certain embodiments, the term "$C_{3-20}$ carbocycle" refers to a 3- to 8-membered saturated or partially unsaturated monocyclic carbocyclic ring, or a 7- to 20-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms. In some embodiments, alkyl groups contain 1-4 carbon atoms. In certain embodiments, alkyl groups contain 1-3 carbon atoms. In some embodiments, alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms. In some embodiments, alkenyl groups contain 2-4 carbon atoms. In some embodiments, alkenyl groups contain 2-3 carbon atoms. In some embodiments, alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms. In some embodiments, alkynyl groups contain 2-4 carbon atoms. In some embodiments, alkynyl groups contain 2-3 carbon atoms. In some embodiments, alkynyl groups contain 2 carbon atoms. Representative alkynyl groups include, but are not limited to, ethynyl, 2-propynyl (propargyl), 1-propynyl, and the like.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring. In certain embodiments, the term "6- to 14-membered aryl" refers to a phenyl or an 8- to 14-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3 (4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 14-membered heteroaryl" refers to a 5- to 6-membered heteroaryl ring having 1 to 3 heteroatoms independently selected from nitrogen, oxygen, or sulfur, or an 8- to 14-membered polycyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7- to 14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 8-membered heterocycle" refers to a 3- to 8-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur. In some embodiments, the term "3- to 14-membered heterocycle" refers to a 3- to 8-membered saturated or partially unsaturated monocyclic heterocyclic ring having 1 to 2 heteroatoms independently selected from nitrogen, oxygen, or sulfur, or a 7- to 14-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

One of ordinary skill in the art will appreciate that the synthetic methods, as described herein, may utilize a variety of protecting groups. By the term "protecting group," as used herein, it is meant that a particular functional moiety, e.g., O, S, or N, is masked or blocked, permitting, if desired, a reaction to be carried out selectively at another reactive site in a multifunctional compound. In some embodiments, a protecting group reacts selectively in good yield to give a protected substrate that is stable to the projected reactions; the protecting group is preferably selectively removable by readily available, preferably non-toxic reagents that do not attack the other functional groups; the protecting group forms a separable derivative (more preferably without the generation of new stereogenic centers); and the protecting group will preferably have a minimum of additional functionality to avoid further sites of reaction. By way of non-limiting example, hydroxyl protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, a-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4''-tris(4,5-dichlorophthalimidophenyl)methyl, 4,4',4''-tris(levulinoyloxyphenyl)methyl, 4,4',4''-tris(benzoyloxyphenyl)methyl, 3-(imidazol-1-yl)bis(4',4''-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-naphthyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). Exemplary protecting groups are detailed herein, however, it will be appreciated that the present disclosure is not intended to be limited to these protecting groups; rather, a variety of additional equivalent protecting groups can be readily identified using the above criteria and utilized in the method of the present disclosure. Additionally, a variety of protecting groups are described by Greene and Wuts (infra).

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R°; —(CH$_2$)$_{0-4}$OR°; —O—(CH$_2$)$_{0-4}$C(O)OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; (CH$_2$)$_{0-4}$C(O)N(R°)$_2$; —(CH$_2$)$_{0-4}$C(O)SR°; —(CH$_2$)$_{0-4}$C(O)OSiR°$_3$; —(CH$_2$)$_{0-4}$OC(O)R°; —OC(O)(CH$_2$)$_{0-4}$SR—, SC(S)SR°; —(CH$_2$)$_{0-4}$SC(O)R°; —(CH$_2$)$_{0-4}$C(O)NR°$_2$; —C(S)NR°$_2$; —C(S)SR°; —SC(S)SR°, —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched alkylene)O—N(R°)$_2$; or —(C$_{1-4}$ straight or branched alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3- to 12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R°)$_2$; —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet_2$, —NO$_2$, —SiR$^\bullet_3$, —OSiR$^\bullet_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5- to 6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5- to 6-membered saturated, partially unsaturated, or aryl ring having 0-4 heteroatoms independently selected from nitrogen, oxygen, or sulfur.

Suitable substituents on the aliphatic group of R* include halogen, —R●, -(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5- to 6-membered saturated, partially unsaturated, or aryl ring having 0-4 heteroatoms independently selected from nitrogen, oxygen, or sulfur.

—O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5- to 6-membered saturated, partially unsaturated, or aryl ring having 0-4 heteroatoms independently selected from nitrogen, oxygen, or sulfur.

In some chemical structures herein, substituents are shown attached to a bond which crosses another bond of a depicted molecule. This means that one or more of the substituents may be attached to the molecule at any available position (usually in place of a hydrogen atom of the parent structure). In cases where an atom of a molecule so substituted has two substitutable positions, two groups may be present on the same ring atom. When more than one substituent is present, each is defined independently of the others, and each may have a different structure. In cases where the substituent shown crossing a bond of the molecule is —R, this has the same meaning as if the ring were said to be "optionally substituted" as described in the preceding paragraphs.

As used herein, the terms "head-to-tail" or "HT", refer to the regiochemistry of adjacent repeating units in a polymer chain. For example, in the context of poly(propylene carbonate), the term head-to-tail based on the three regiochemical possibilities depicted below:

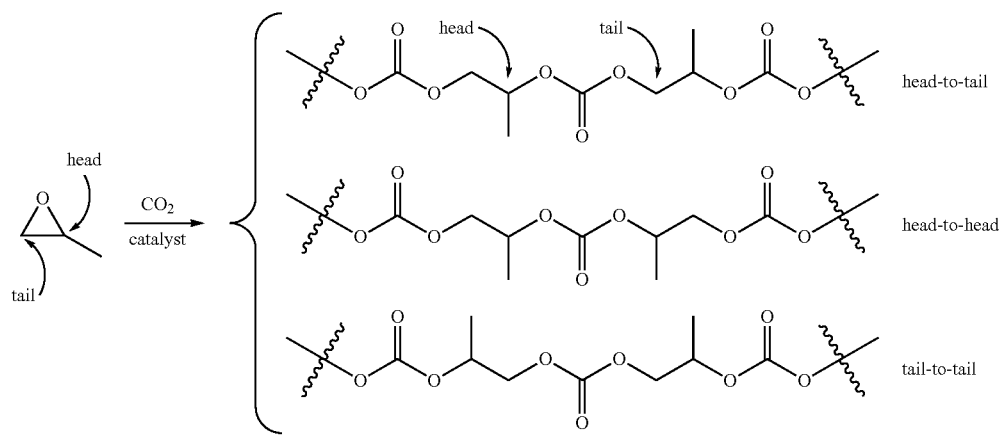

The term head-to-tail ratio (H:T) refers to the proportion of head-to-tail linkages to the sum of all other regiochemical possibilities.

As used herein, the term "mixture," when applied to a substituent, means that the substituent varies throughout the molecule and not all occurrences are the same (i.e., it refers to a plurality of the substituent rather than a single occurrence of the substituent). For example, "R$^1$ is a mixture of methyl, ethyl, and propyl groups" will be understood to mean "R$^1$ is selected from the group consisting of methyl, ethyl, and propyl, wherein not all occurrences of R$^1$ are the same."

Suitable substituents on a substitutable nitrogen of an "optionally substituted" group include —R$^†$, —NR$^†$$_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†$$_2$, —C(S)NR$^†$$_2$, —C(NH)NR$^†$$_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5- to 6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3- to 12-membered saturated, partially unsaturated, or aryl mono- or bicyclic ring having 0-4 heteroatoms independently selected from nitrogen, oxygen, or sulfur.

Figure 1:
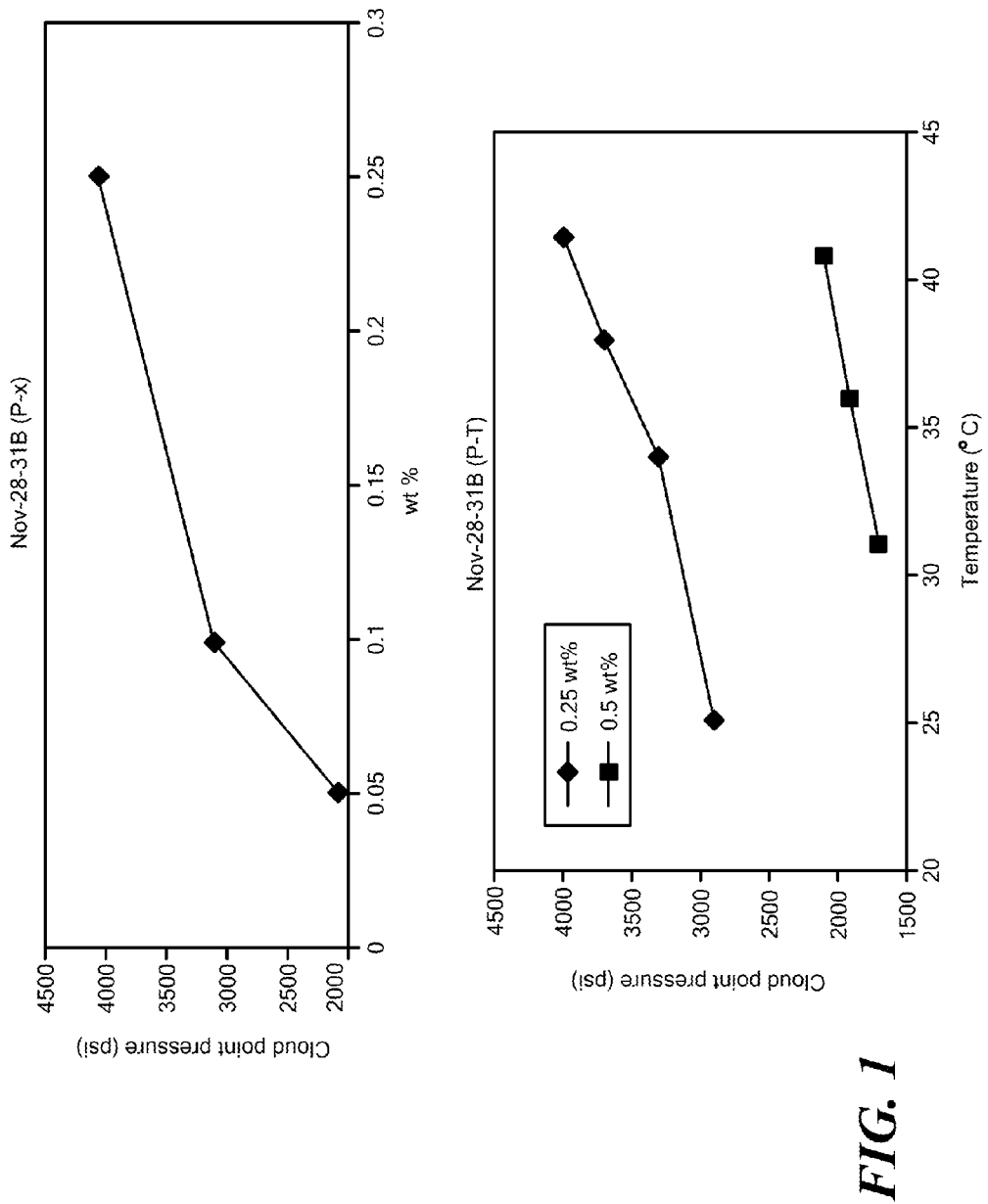
FIG. 1 depicts supercritical CO$_2$ solubility of a composition of the present invention comprising a diblock copolymer of poly(propylene carbonate) (PPC) and poly(ethylene glycol) (PEG).
Figure 2:
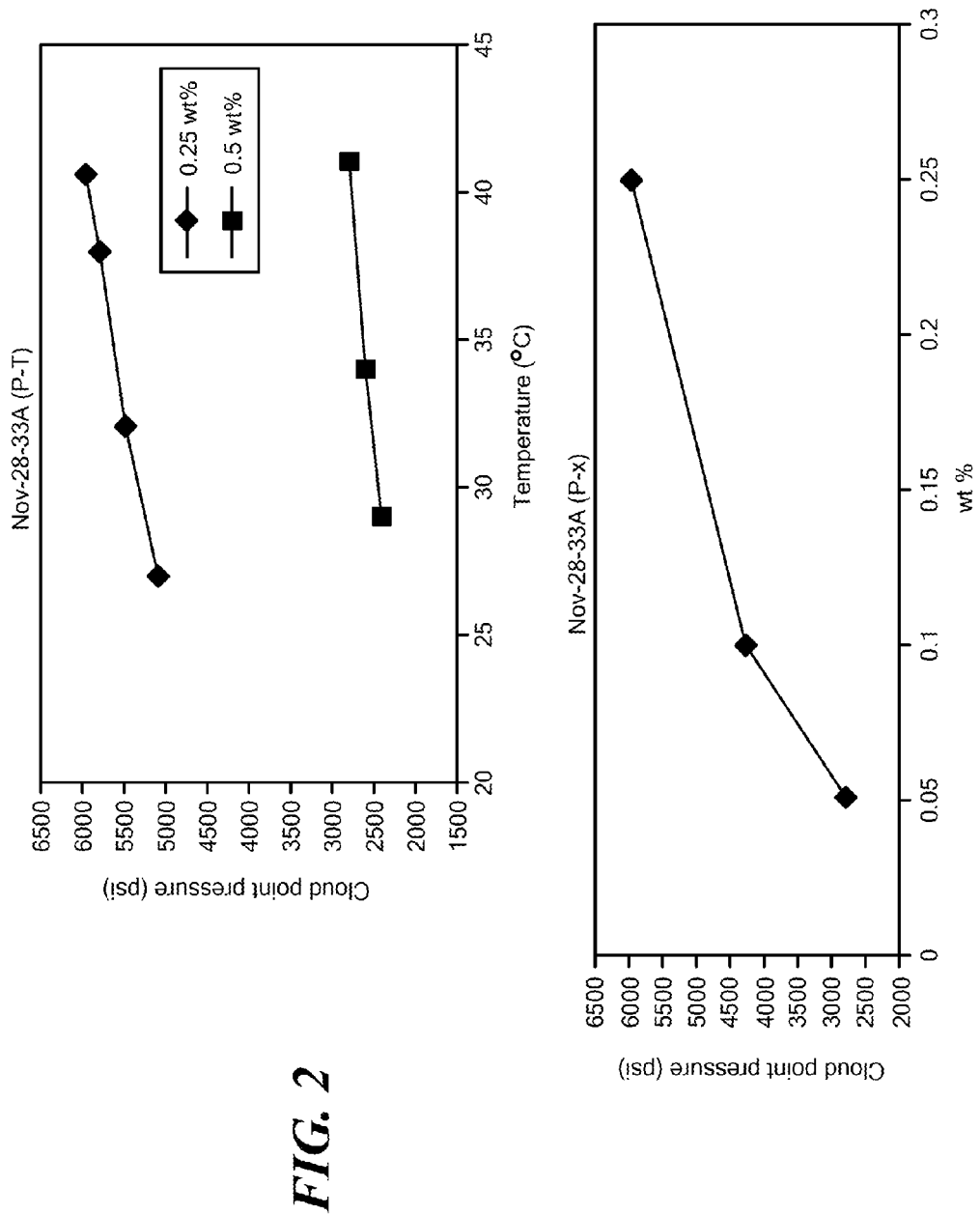
FIG. 2 depicts supercritical CO$_2$ solubility of a composition of the present invention comprising a diblock copolymer of PPC and PEG.
Figure 3:
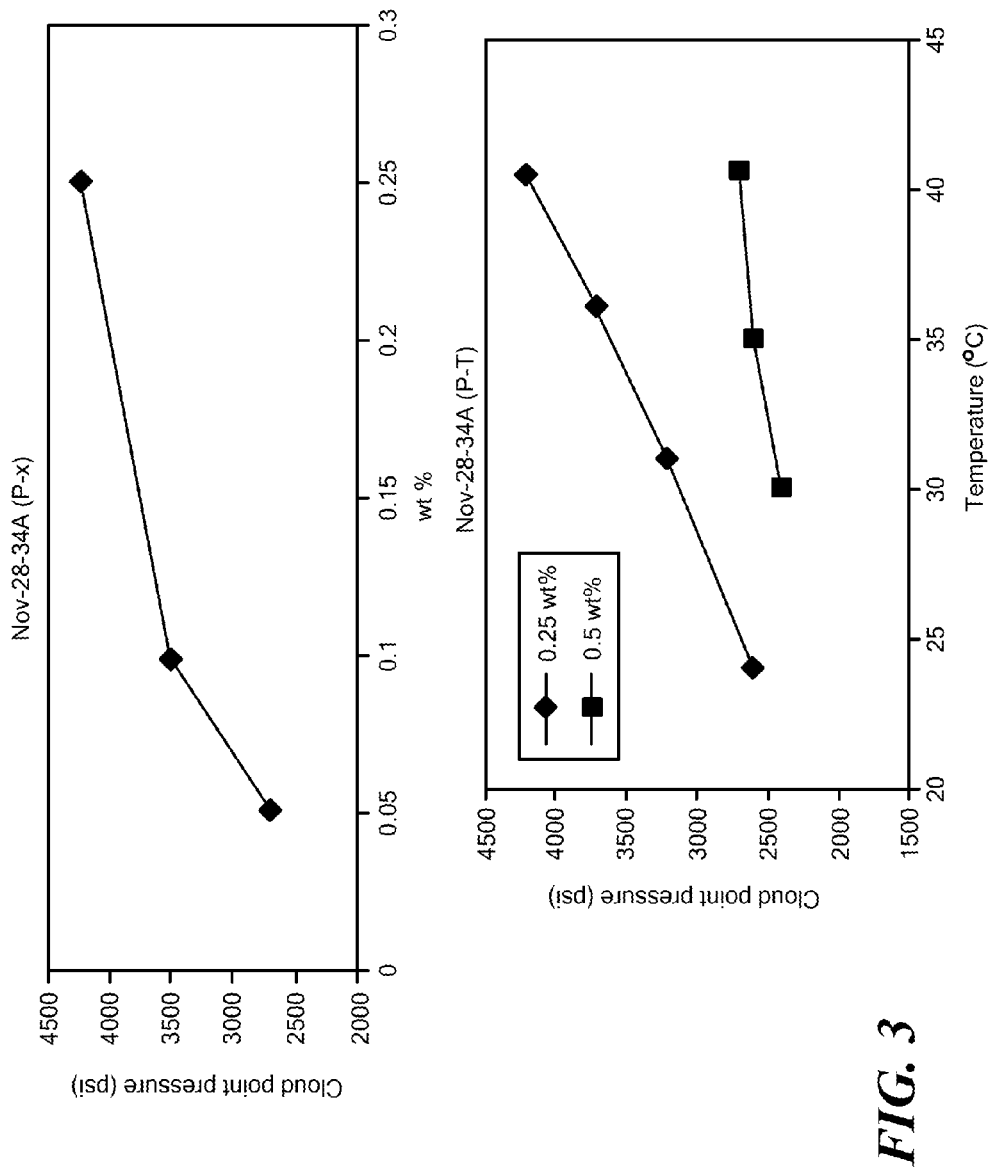

Suitable substituents on the aliphatic group of R$^†$ are independently halogen, —R●,-(haloR●), —OH, —OR●, FIG. 3 depicts supercritical $CO_2$ solubility of a composition of the present invention comprising a diblock copolymer of PPC and PEG.

Figure 4:
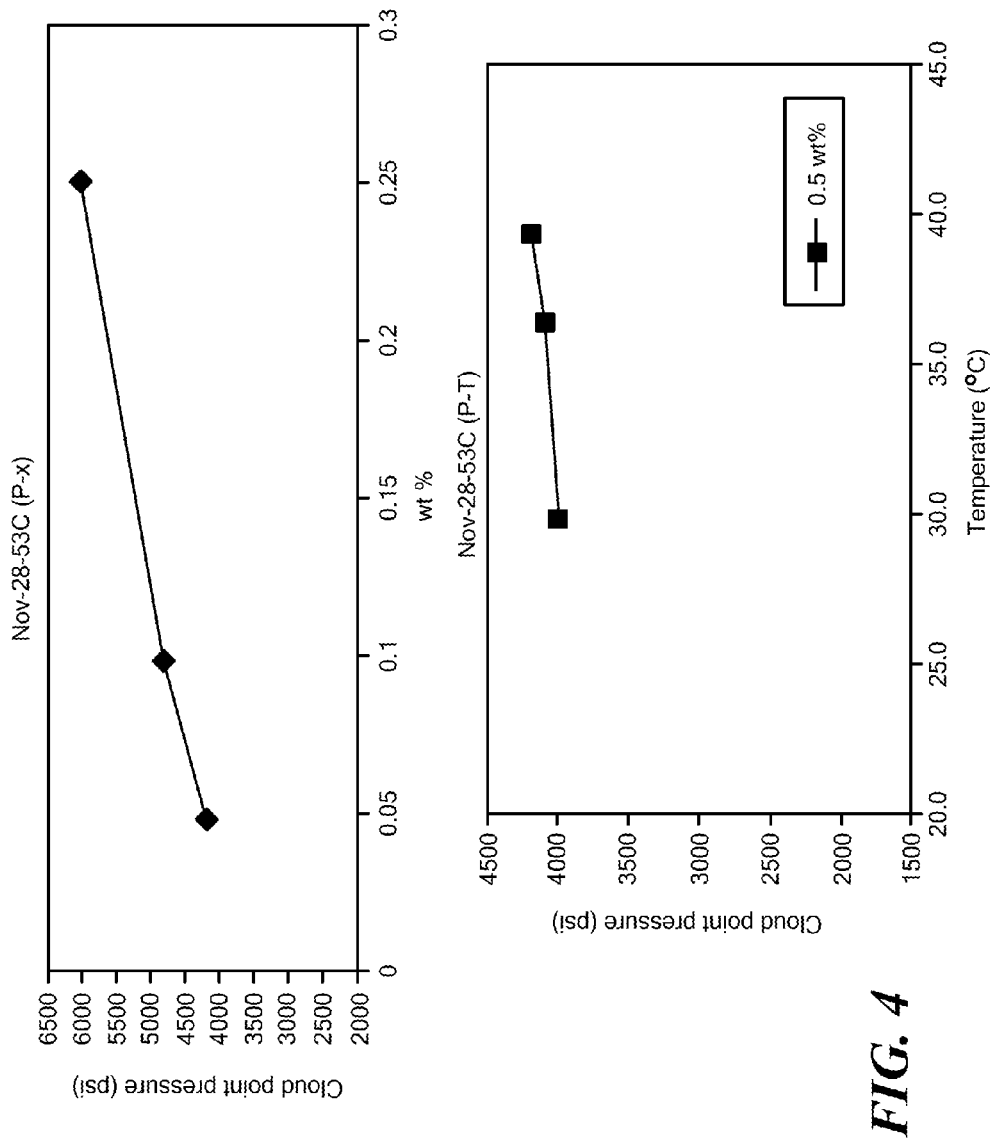

FIG. 4 depicts supercritical $CO_2$ solubility of a composition of the present invention comprising a triblock copolymer of PPC and PEG.

Figure 5:
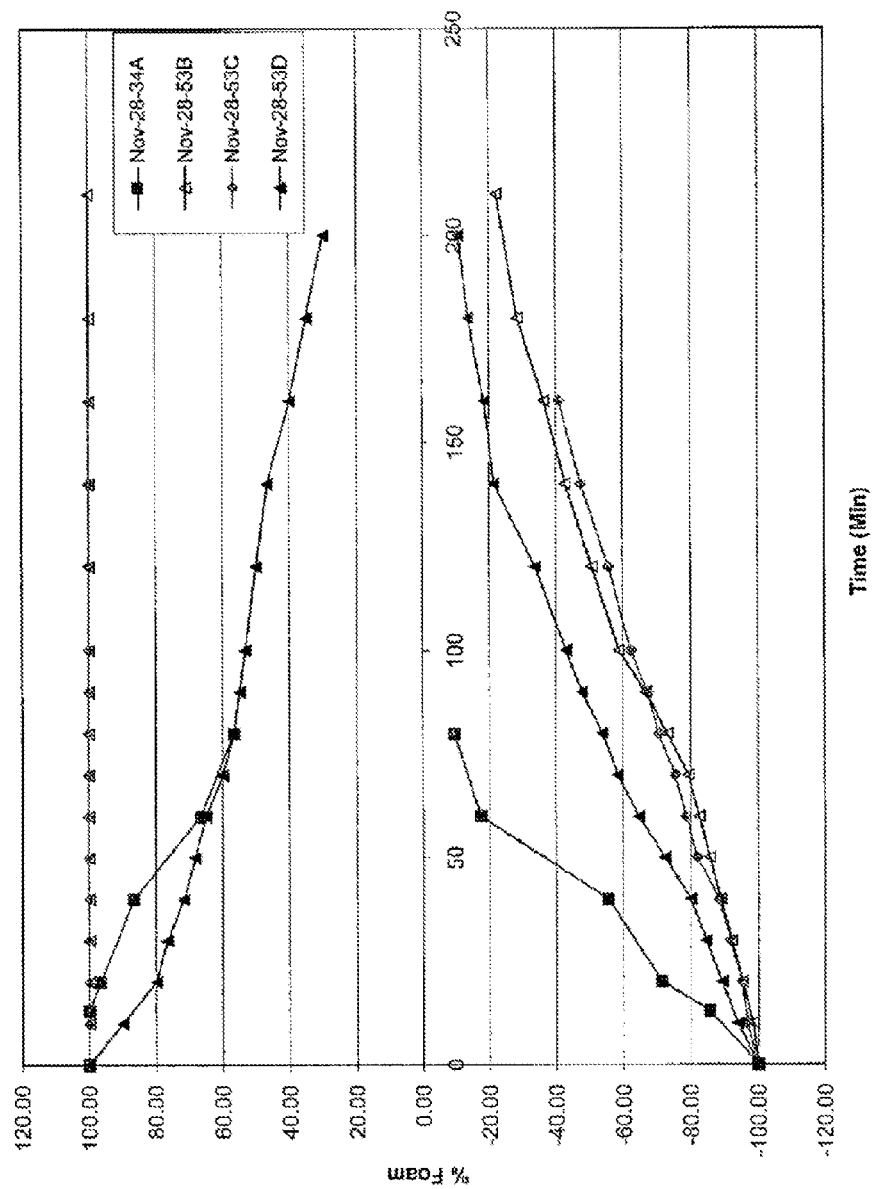

FIG. 5 shows the stability over time of $CO_2$/water foams stabilized by PPC/PEG diblock co-polymers (28-34A) and PPC/PEG/PPC triblock copolymers (28-53B -53C and -53D) of the present invention where the bottom half of the y-axis represents the depth of foam in the aqueous phase, and the upper half of the y-axis represents the height of foam in the supercritical $CO_2$ phase.

Figure 6:
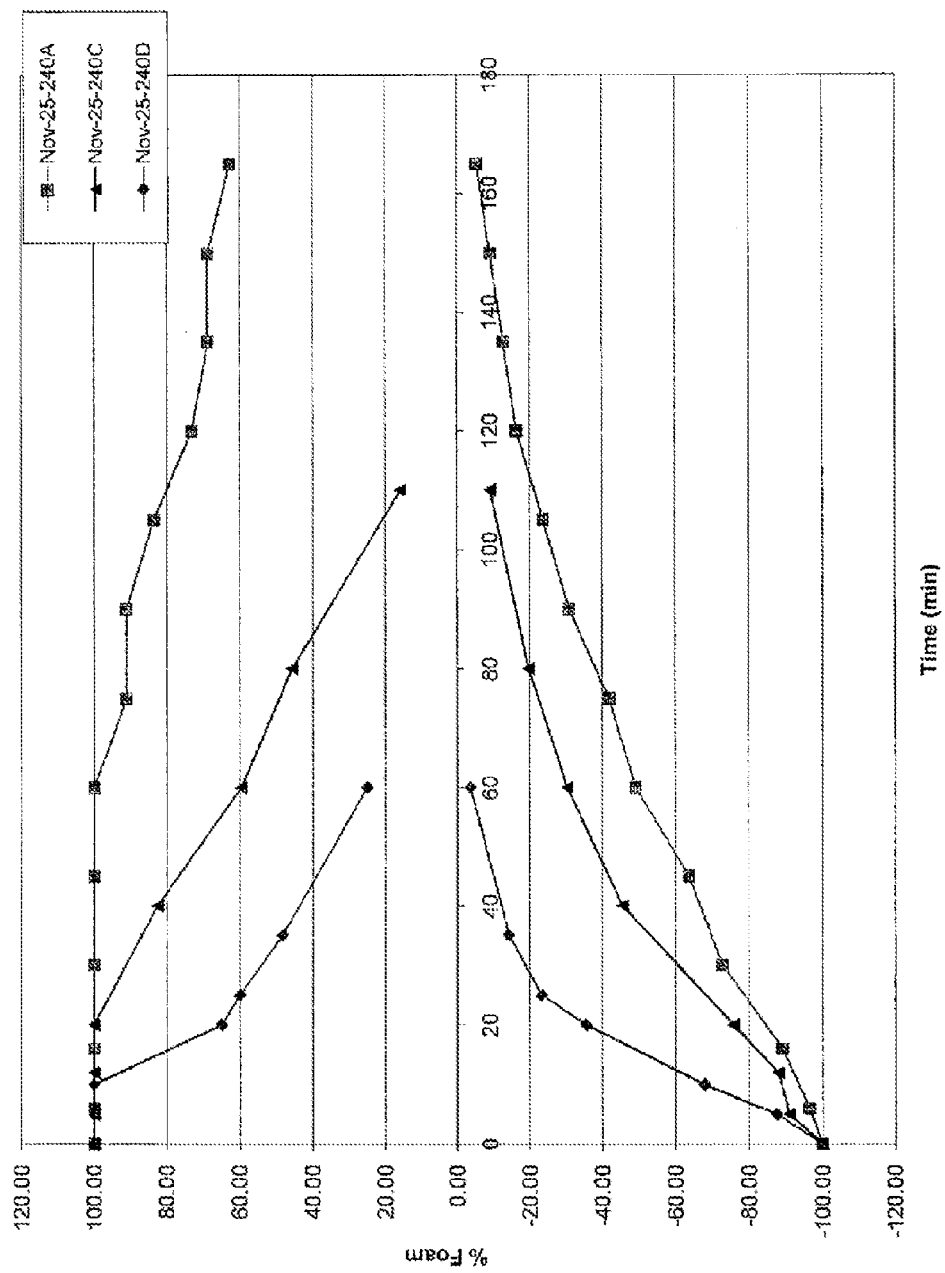

FIG. 6 shows the stability over time of $CO_2$/water foams stabilized by PPC/PPG/PPC triblock copolymers of the present invention where each block in the copolymer comprises between 3 and 12 repeat units.

DETAILED DESCRIPTION OF CERTAIN EMBODIMENTS

The present disclosure encompasses the recognition that block copolymers comprising a polycarbonate chain have utility in a number of applications involving interaction with $CO_2$. In some embodiments, the present disclosure provides copolymers and compositions thereof comprising a polycarbonate or a polyether-polycarbonate chain, methods of making, and methods of using the same.

In certain embodiments, provided block copolymers of formula A-L-B, where A- is a polycarbonate or a polyether-polycarbonate chain having from about 3 to about 500 repeating units, L is a linker moiety or a covalent bond and -B is a hydrophilic oligomer having from about 4 to about 500 repeating units.

In some embodiments, A- is a polycarbonate chain. In some embodiments, A- is a polycarbonate chain containing greater than about 95%, greater than about 98%, or greater than about 99% carbonate linkages. In some embodiments, A- is an aliphatic polycarbonate chain. In certain embodiments, the aliphatic polycarbonate is a copolymer of an optionally substituted epoxide and carbon dioxide. In certain embodiments, the polycarbonate is selected from the group consisting of poly(ethylene carbonate), poly(propylene carbonate), poly(butylene carbonate), poly(glycidylether carbonate), poly(chloromethylethylene carbonate), poly(cyclopentene carbonate), poly(cyclohexene carbonate), poly(3-vinyl cyclohexene carbonate) and random-, block- or tapered-copolymers of any two or more of the above.

In certain embodiments, a polycarbonate chain A- is poly (propylene carbonate). In certain embodiments, a polycarbonate chain A- is poly(ethylene carbonate). In certain embodiments, a polycarbonate chain A- is poly(chloromethylethylene carbonate). In certain embodiments, a polycarbonate chain A- is poly(butylene carbonate). In certain embodiments, a polycarbonate chain A- is a poly(glycidyl ether carbonate). In certain embodiments, a polycarbonate chain A- is a poly(glycidyl ester carbonate). In certain embodiments, a polycarbonate chain A- is a random copolymer comprising poly(propylene carbonate) and poly(ethylene carbonate). In some embodiments, a polycarbonate chain A- is a random copolymer comprising poly(propylene carbonate) and poly (n-butylene carbonate). In certain embodiments, a polycarbonate chain A- is a random copolymer comprising poly (propylene carbonate) and a polycarbonate derived from the epoxide of a $C_{6-30}$ alpha olefin.

In certain embodiments, a polycarbonate chain A- includes about 3 to about 500 repeating units. In certain embodiments, a polycarbonate chain includes about 5 to about 50 repeating units. In certain embodiments, a polycarbonate chain includes about 3 to about 20 repeating units. In certain embodiments, a polycarbonate chain includes about 10 to about 15 repeating units. In certain embodiments, a polycarbonate chain includes about 20 to about 50 repeating units.

In some embodiments, a polymer chain A- is a random or tapered polyether polycarbonate copolymer. In certain embodiments, the proportion of ether linkages in a polyether polycarbonate chain A- ranges from about 0.1% to about 50%. In certain embodiments, the proportion of ether linkages in a polyether polycarbonate chain A-ranges from about 0.1% to about 44%. In certain embodiments, the proportion of ether linkages in a polyether polycarbonate chain A- ranges from about 0.1% to about 43%. In certain embodiments, the proportion of ether linkages in a polyether polycarbonate chain A- ranges from about 0.1% to about 42%. In certain embodiments, the proportion of ether linkages in a polyether polycarbonate chain A- ranges from about 0.1% to about 41%. In certain embodiments, the proportion of ether linkages in a polyether polycarbonate chain A- ranges from about 0.1% to about 40%. In certain embodiments, the proportion of ether linkages in a polyether polycarbonate chain A- ranges from about 0.1% to about 35%. In certain embodiments, the proportion of ether linkages in a polyether polycarbonate chain A- ranges from about 0.1% to about 30%. In certain embodiments, the proportion of ether linkages in a polyether polycarbonate chain A- ranges from about 0.1% to about 25%. In certain embodiments, the proportion of ether linkages in a polyether polycarbonate chain A- ranges from about 0.1% to about 20%. In certain embodiments, the proportion of ether linkages in a polyether polycarbonate chain A- ranges from about 0.1% to about 15%. In certain embodiments, the proportion of ether linkages in a polyether polycarbonate chain A- ranges from about 0.1% to about 10%. In certain embodiments, the proportion of ether linkages in a polyether polycarbonate chain A- ranges from about 0.1% to about 5%. In certain embodiments, the proportion of ether linkages in a polyether polycarbonate chain A- ranges from about 0.1% to about 2%.

In certain embodiments, the proportion of ether linkages in a polyether polycarbonate chain A- is less than 50%. In certain embodiments, the proportion of ether linkages in a polyether polycarbonate chain A- is less than 44%. In certain embodiments, the proportion of ether linkages in a polyether polycarbonate chain A- is less than 43%. In certain embodiments, the proportion of ether linkages in a polyether polycarbonate chain A- is less than 42%. In certain embodiments, the proportion of ether linkages in a polyether polycarbonate chain A- is less than 41%. In certain embodiments, the proportion of ether linkages in a polyether polycarbonate chain A- is less than 40%. In certain embodiments, the proportion of ether linkages in a polyether polycarbonate chain A- is less than 35%. In certain embodiments, the proportion of ether linkages in a polyether polycarbonate chain A- is less than 30%. In certain embodiments, the proportion of ether linkages in a polyether polycarbonate chain A- is less than 25%. In certain embodiments, the proportion of ether linkages in a polyether polycarbonate chain A- is less than 20%. In certain embodiments, the proportion of ether linkages in a polyether polycarbonate chain A- is less than 15%. In certain embodiments, the proportion of ether linkages in a polyether polycarbonate chain A- is less than 10%. In certain embodiments, the proportion of ether linkages in a polyether polycarbonate chain A- is less than 9%. In certain embodiments, the proportion of ether linkages in a polyether polycarbonate chain A- is less than 8%. In certain embodiments, the proportion of ether linkages in a polyether polycarbonate chain A- is less than 7%. In certain embodiments, the proportion of ether linkages in a polyether polycarbonate chain A- is less than 6%. In certain embodiments, the proportion of ether linkages in a polyether polycarbonate chain A- is less than 5%. In certain embodiments, the proportion of ether linkages in a polyether polycarbonate chain A- is less than 4%. In certain embodiments, the proportion of ether linkages in a polyether polycarbonate chain A- is less than 3%. In certain embodiments, the proportion of ether linkages in a polyether polycarbonate chain A- is less than 2%. In certain embodiments, the proportion of ether linkages in a polyether polycarbonate chain A- is less than 1%.

In certain embodiments, the proportion of ether linkages in a polyether polycarbonate chain A- ranges from about 0.1% to about 25%. In certain embodiments the proportion of ether linkages in a polyether polycarbonate chain A- is less than about 10%. In certain embodiments the proportion of ether linkages in a polyether polycarbonate chain A- ranges from about 1% to about 5%. In certain embodiments, the proportion of ether linkages in a polyether polycarbonate chain A- ranges from about 20% to about 50%.

In certain embodiments, L is a covalent bond (i.e. A- is bonded directly to -B). In other embodiments, L is a polyfunctional moiety having appropriate functionality to form a covalent chemical bond with both the polycarbonate chain and the hydrophilic oligomer. In certain instances, L is a moiety formed by the reaction of one functional group on A- and one functional group on -B with a polyfunctional molecule capable of reaction with the functional groups on A- and -B thereby linking them. Examples of suitable polyfunctional moieties for L include, but are not limited to: agents that can form one or more linkages such as ester, amide, ether, amine, thioether, carbonate, or other similar linkages. Examples of polyfunctional molecules suitable for incorporation as L include, but are not limited to: phosgene, diacids, anhydrides, acrylates, diisocyanates, epoxides, diols, diamines, hydroxy mercaptans, mercapto acids, hydroxy acids, amino acids, and any precursors or reactive equivalents thereof.

In certain embodiments, a linker L is a moiety formed directly by the reaction of complementary functional groups on termini of A- and -B. Examples of such moieties include, but are not limited to: L being an ester, (formed from an alcohol group on the terminus of A- and a carboxy group on the terminus of -B, or vice versa); L being an amide; (formed from an amine group on the terminus of A- and a carboxy group on the terminus of -B, or vice versa); L being an olefin (formed, for example, by olefin metathesis); L being a heterocycle, (for example a triazole formed by cycloaddition of an azide and an alkyne), and L being a cyclohexene ring formed by Diels Alder cycloaddition of a diene and a dienophile.

In certain embodiments, a hydrophilic oligomer -B is a polyether chain. In some embodiments, -B is a polyolefin chain bearing hydrophilic functional groups. In certain embodiments, a hydrophilic oligomer -B is a polyamine chain. In certain embodiments,-B is selected from the group consisting of polyoxymethylene, poly(ethylene oxide), poly (propylene oxide), polyvinyl alcohol, poly(vinyl acetate), partially hydrolyzed poly(vinyl acetate), poly(acrylic acid), polyacrylamide, polyethyleneimine, poly(2-hydroxyethyl methacrylate), poly(N-vinylpyrrolidone), polypeptides, polysaccharides, polyepoxysuccinic acid, poly(methyl vinyl ether), poly(allylamine), poly(2-ethyl-2-oxazoline), and block, tapered or random copolymers of any two or more of the above. In some embodiments, -B is polyoxymethylene. In some embodiments, -B is poly(ethylene oxide). In some embodiments, -B is poly(propylene oxide).

In certain embodiments, a hydrophilic oligomer -B includes from about 4 to about 400 repeating units. In certain embodiments, a hydrophilic oligomer chain includes less than about 100 repeating units. In certain embodiments, a hydrophilic oligomer chain includes about 10 to about 50 repeating units. In certain embodiments, a hydrophilic oligomer chain includes about 10 to about 20 repeating units.

In certain embodiments, polymers of the present invention have a total average molecular weight between about 300 g/mol and about 25,000 g/mol. In certain embodiments, polymers have a total average molecular weight between about 500 g/mol and about 5,000 g/mol. In some embodiments, polymers have a total average molecular weight between about 800 g/mol and about 2,500 g/mol.

polycarbonates

In certain embodiments, a polymer A-L-B has the formula I:

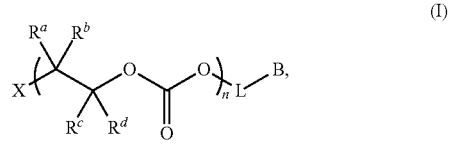

where X is selected from the group consisting of: halogen; —OH; azide, nitrile, and —OR$^z$;

each R$^a$, R$^b$, R$^c$, and R$^d$ is independently selected from the group consisting of: hydrogen, halogen, —CH$_2$OR$^z$, optionally substituted C$_{1-30}$ aliphatic, optionally substituted 6- to 14-membered aromatic, optionally substituted 3- to 14-membered heterocyclic, and optionally substituted 5- to 14-membered heteroaryl, where any two or more of R$^a$, R$^b$, R$^c$, and R$^d$ may be taken together to form an optionally substituted 3- to 12-membered ring, optionally containing one or more heteroatoms;

L is a bond or a polyfunctional moiety;

B is a hydrophilic oligomer having from 4 to 100 repeating units;

n is an integer between 3 and 100;

R$^z$ is selected from the group consisting of R$^{10}$, C(O)R$^{10}$, —SO$_2$R$^{10}$, —Si(R$^{10}$)$_3$, and —C(O)N(R$^{10}$)$_2$; and R$^{10}$ is an optionally substituted moiety selected from the group consisting of: C$_{1-20}$ aliphatic; C$_{1-12}$ heteroaliphatic; 6- to 14-membered aryl; and 5- to 14-membered heteroaryl.

In certain embodiments, polymers of formula I comprise a polycarbonate chain containing greater than about 90% carbonate linkages. In certain embodiments, the polycarbonate chain contains greater than about 95%, greater than about 98%, or greater than about 99% carbonate linkages. In certain embodiments, the polycarbonate chain contains essentially no detectable ether linkages.

In certain embodiments, the polymer A-L-B has the formula I-a:

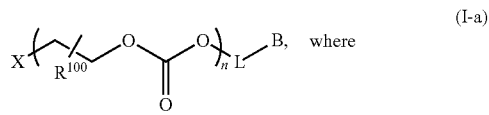

X, L, B, and n are as defined above, and

R$^{100}$ is optionally present, and if present is selected from the group consisting of CH$_3$, —CF$_3$, —CH$_2$CH$_3$, —CH$_2$OR$^z$, —CH$_2$Cl, a C$_{3-30}$ alkyl group, and mixtures of two or more of these where R$^z$ is as defined above.

In certain embodiments, a polymer A-L-B has the formula I-b:

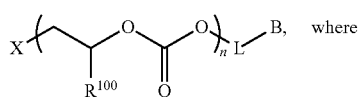

X, L, B, $R^{100}$, and n are as defined above.

In certain embodiments, a polymer A-L-B has formula I-c:

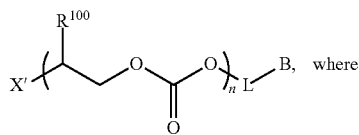

L, B, $R^{100}$, and n are as defined above, and X' is selected from the group consisting of —OH and —$OR^z$.

In certain embodiments, where a polymer has one of the formulae I-b or I-c, where $R^{100}$ is present, the head to tail ratio of adjacent

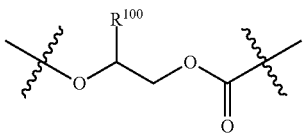

groups is greater than about 80%. In certain embodiments, the head to tail ratio is greater than about 90%. In certain embodiments, the head to tail ratio is greater than about 91%. In certain embodiments, the head to tail ratio is greater than about 92%. In certain embodiments, the head to tail ratio is greater than about 93%. In certain embodiments, the head to tail ratio is greater than about 94%. In certain embodiments, the head to tail ratio is greater than about 95%.

In certain embodiments, in polymers of formulae I-a through I-c $R^{100}$ is absent (e.g. the polycarbonate chain comprises poly(ethylene carbonate)). In certain embodiments, in polymers of formulae I-a through I-c, $R^{100}$ is a methyl group. In certain embodiments, in polymers of formulae I-a through I-c, $R^{100}$ is a $C_{3-30}$ alkyl group. In certain embodiments, in polymers of formulae I-a through I-c, $R^{100}$ is a $C_{3-10}$ alkyl group. In certain embodiments, in polymers of formulae I-a through I-c, $R^{100}$ is a $C_{3-6}$ alkyl group. In certain embodiments, in polymers of formulae I-a through I-c, $R^{100}$ is an ethyl group. In certain embodiments, in polymers of formulae I-a through I-c, $R^{100}$ is a chloromethyl group. In certain embodiments, in polymers of formulae I-a through I-c, $R^{100}$ is a random mixture of methyl and ethyl groups. In certain embodiments, in polymers of formulae I-a through I-c, $R^{100}$ is a random mixture of methyl and chloromethyl groups. In certain embodiments, in polymers of formulae I-a through I-c, $R^{100}$ is a random mixture of methyl and one or more $C_{3-30}$ alkyl groups.

In certain embodiments, in polymers of formulae I-a through I-c, $R^{100}$ is a —$CH_2OR^z$ group. In certain embodiments, the $CH_2OR^z$ group comprises an ether group (e.g. the polycarbonate chain is a poly(glycidyl ether carbonate)). In other embodiments the $CH_2OR^z$ group comprises an ester group (e.g. the polycarbonate chain is a poly(glycidyl ester carbonate)). In certain embodiments, $R^{100}$ is a random mixture of $C_{3-30}$ alkyl and —$CH_2OR^z$ groups.

In certain embodiments, for polymers of formula I-b, X is —$OR^{10}$. In other embodiments, for polymers of formula I-b, X is —$OC(O)R^{10}$. In certain embodiments, for polymers of formula I-b, X is Cl, or Br. In certain embodiments, for polymers of formula I-b, X is azide or a nitrile. In certain embodiments, for polymers of formula I-b, X is acetate. In certain embodiments, for polymers of formula I-b, X is trifluoroacetate. In certain embodiments, for polymers of formula I-b, X is optionally substituted benzoate. In certain embodiments, for polymers of formulae I-b, X is optionally substituted phenoxide. In certain embodiments, for polymers of formulae I-b, X is a nitro phenoxide.

In certain embodiments, for polymers of formulae I-c, X' is —OH. In certain embodiments, for polymers of formulae I-c, X' is —$OR^y$, where $R^y$ is an —OH protecting group. In certain embodiments, for polymers of formulae I-c, X' is —$OC(O)R^{10}$. In certain embodiments, for polymers of formulae I-c, X' is —$OS(O)_2R^{10}$. In certain embodiments, for polymers of formulae I-c, X' is —$OSi(R^{10})_3$. In certain embodiments, for polymers of formulae I-c, X' is —$OC(O)N(R^{10})_2$. In certain embodiments, for polymers of formulae I-c, X' is acetate. In certain embodiments, for polymers of formulae I-c, X' is trifluoroacetate. In certain embodiments, for polymers of formulae I-c, X' is optionally substituted benzyl or benzoate.

The present invention encompasses polymer compositions comprising polymer chains of formulae I through I-c above wherein the value of n is, on average, between about 5 and about 200. In certain embodiments, the value of n is, on average between about 5 and about 100. In certain embodiments, the value of n is, on average between about 5 and about 50. In certain embodiments, the value of n is, on average between about 5 and about 25. In certain embodiments, the value of n is, on average between about 5 and about 10. In certain embodiments, the value of n is, on average between about 10 and about 20.

In certain embodiments, a polymer A-L-B has the formula II:

where A and L are as defined above, m is an integer between about 4 and about 500, —Z— is an optionally substituted $C_{1-6}$ aliphatic group, and —Y is selected from the group consisting of —H and $R^z$.

In certain embodiments, a polymer A-L-B has the formula II-a:

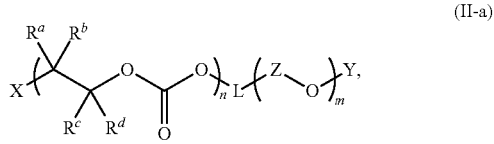

where X, $R^a$, $R^b$, $R^c$, $R^d$, n, L, Z, m, and Y are as defined above.

In certain embodiments, a polymer A-L-B has the formula II-b:

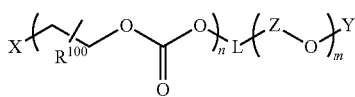
(II-b)

where X, $R^{100}$, n, L, Z, m, and Y are as defined above.

In certain embodiments, a polymer A-L-B has the formula II-c:

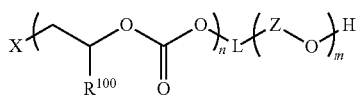
(II-c)

where $R^{100}$, n, L, Z, and m are as defined above and wherein X is other than —OH.

In certain embodiments, a polymer A-L-B has the formula II-d:

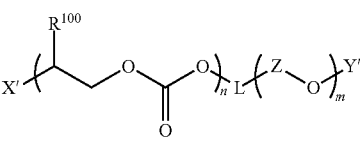
(II-d)

where X', $R^{100}$, n, L, Z, and m are as defined above, and Y' is optionally substituted $C_{1-8}$ aliphatic, a silyl protecting group, or —C(O)$R^{11}$, wherein $R^{11}$ is optionally substituted $C_{1-14}$ aliphatic or 6- to 14-membered aryl.

In certain embodiments, for polymers of formulae II through II-d, Z is —CH$_2$— (e.g. the hydrophilic oligomer -B is polyoxymethylene). In certain embodiments, for polymers of formulae II through II-d, Z is —CH$_2$CH$_2$— (e.g. the hydrophilic oligomer -B is polyethylene glycol). In certain embodiments, for polymers of formulae II through II-d, Z is —CH(CH$_3$)CH$_2$— (e.g. the hydrophilic oligomer -B is polypropylene glycol).

In certain embodiments, in polymers of formulae II, II-a, or II-b, —Y is an optionally substituted $C_{1-20}$ aliphatic group. In certain embodiments, Y is selected from the group consisting of methyl, ethyl, n-propyl, i-propyl, n-butyl, sec-butyl, t-butyl, allyl and benzyl. In certain embodiments, in polymers of formulae II, II-a or II-b, —Y is an acyl group. In certain embodiments, Y is selected from the group consisting of formate, acetate, trifluoroacetate, propionate, butyrate, acrylate, and optionally substituted benzoate. In certain embodiments, in polymers of formulae II, II-a or II-b, —Y is —Si($R^{10}$)$_3$. In certain embodiments, in polymers of formulae II, II-a or II-b, —Y is a silyl protecting group. In certain embodiments, Y is selected from the group consisting of trimethylsilyl, triethylsilyl, triisopropyl silyl, t-butyldimethylsilyl, and t-butyldiphenylsilyl. In certain embodiments, in polymers of formulae II, II-a or II-b, —Y is —H.

In certain embodiments, in polymers of formulae II-b through II-d, $R^{100}$ is absent (e.g. the polycarbonate chain comprises poly(ethylene carbonate). In certain embodiments, in polymers of formulae II-b through II-d, $R^{100}$ is a $C_{3-30}$ alkyl group. In certain embodiments, in polymers of formulae II-b through II-d, $R^{100}$ is a $C_{3-10}$ alkyl group. In certain embodiments, in polymers of formulae II-b through II-d, $R^{100}$ is a $C_{3-6}$ alkyl group. In certain embodiments, in polymers of formulae II-b through II-d, $R^{100}$ is a methyl group. In certain embodiments, in polymers of formulae II-b through II-d, $R^{100}$ is an ethyl group. In certain embodiments, in polymers of formulae II-b through II-d, $R^{100}$ is a random mixture of methyl and ethyl groups. In certain embodiments, in polymers of formulae II-b through II-d, $R^{100}$ is a chloromethyl group. In certain embodiments, in polymers of formulae II-b through II-d, $R^{100}$ is a random mixture of methyl and chloromethyl groups. In certain embodiments, in polymers of formulae II-b through II-d, $R^{100}$ is a random mixture of methyl and one or more $C_{3-30}$ alkyl groups. In certain embodiments, $R^{100}$ is partially absent, wherein one or more n-bracketed repeating units comprise no $R^{100}$ group, while the remaining n-bracketing repeating units comprise a $R^{100}$ group.

In certain embodiments, in polymers of formulae II-b through II-d, $R^{100}$ is a —CH$_2$O$R^z$ group. In certain embodiments, the CH$_2$O$R^z$ group comprises an ether group (e.g. the polycarbonate chain is a poly(glycidyl ether carbonate)). In other embodiments the CH$_2$O$R^z$ group comprises an ester group (e.g. the polycarbonate chain is a poly(glycidyl ester carbonate)). In certain embodiments, $R^{100}$ is a random mixture of methyl and —CH$_2$O$R^z$ groups.

In certain embodiments, the present invention encompasses polymer compositions comprising polymer chains of formulae II through II-d above wherein the value of n is, on average, between about 5 and about 200. In certain embodiments, the value of n is, on average between about 5 and about 100. In certain embodiments, the value of n is, on average between about 5 and about 50. In certain embodiments, the value of n is, on average between about 5 and about 25. In certain embodiments, the value of n is, on average between about 10 and about 20. In certain embodiments, the value of n is, on average between about 5 and about 10.

In certain embodiments, the present invention encompasses polymer compositions comprising polymer chains of formulae II through II-d above wherein the value of m is, on average, between about 4 and about 500. In certain embodiments, the value of m is, on average between about 5 and about 200. In certain embodiments, the value of m is, on average between about 5 and about 50. In certain embodiments, the value of m is, on average between about 5 and about 25. In certain embodiments, the value of m is, on average between about 10 and about 20. In certain embodiments, the value of n is, on average between about 5 and about 10.

In certain embodiments, where the polymer has one of the formulae II-c or II-d, and $R^{100}$ is present, the head to tail ratio of adjacent

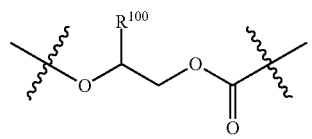

groups is greater than about 80%. In certain embodiments, the head to tail ratio is greater than about 90%. In certain embodiments, the head to tail ratio is greater than about 91%. In certain embodiments, the head to tail ratio is greater than about 92%. In certain embodiments, the head to tail ratio is greater than about 93%. In certain embodiments, the head to tail ratio is greater than about 94%. In certain embodiments, the head to tail ratio is greater than about 95%.

In certain embodiments, copolymers of formula A-L-B described above are characterized in that they have narrow polydispersity indices. In some embodiments, the PDIs of block copolymers of the present invention are less than about 2. In certain embodiments, the PDI is less than 1.5. In some embodiments, the PDI is less than 1.4, less than 1.2 or less than about 1.1.

In certain embodiments, a polymer A-L-B is a block copolymer of polypropylene carbonate) (PPC) or a derivative thereof and poly(ethylene glycol) (PEG) or a derivative thereof. In certain embodiments, such PPC-PEG block copolymers have a formula selected from the group consisting of:

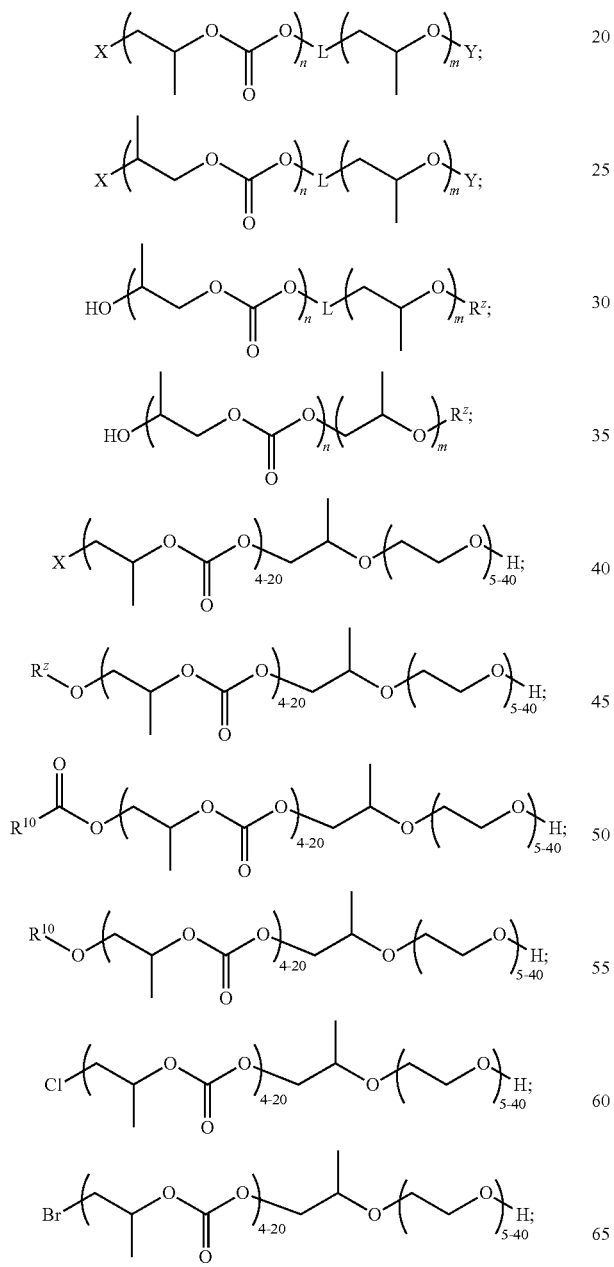

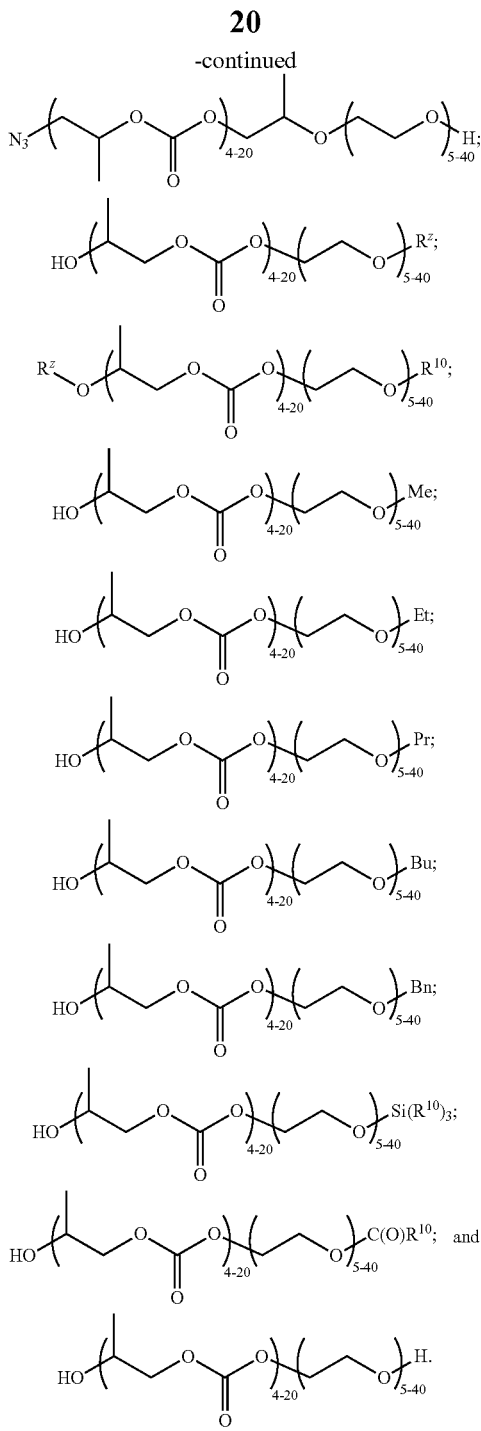

In certain embodiments, a polymer A-L-B is a block copolymer of poly(propylene carbonate) (PPC) or a derivative thereof and poly(propylene glycol) (PPG) or a derivative thereof. In certain embodiments, such PPC-PPG block copolymers have a formula selected from the group consisting of:

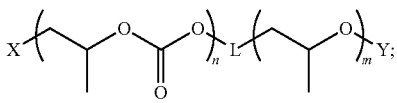

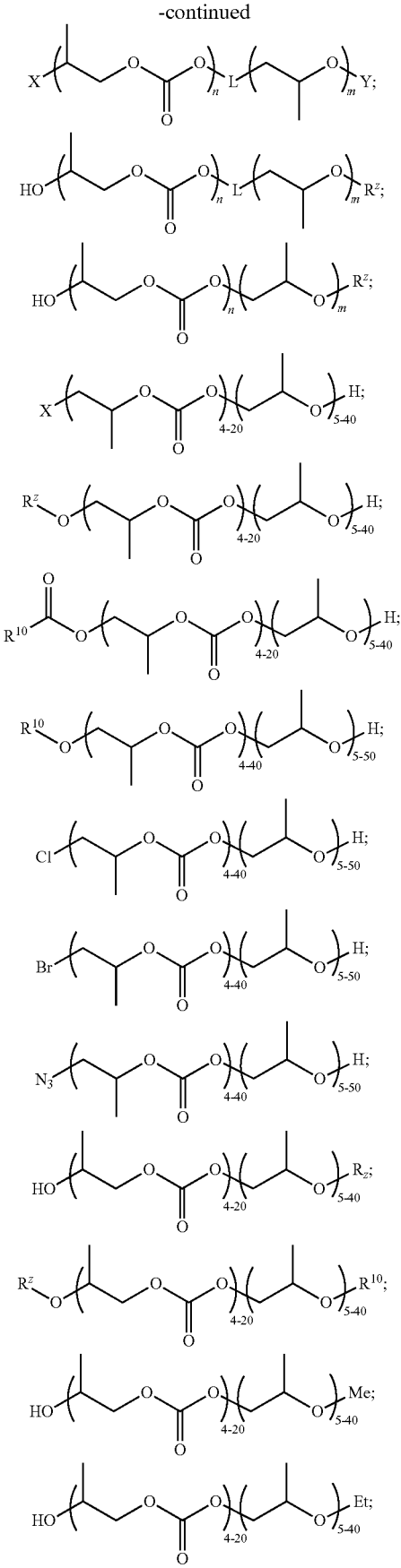
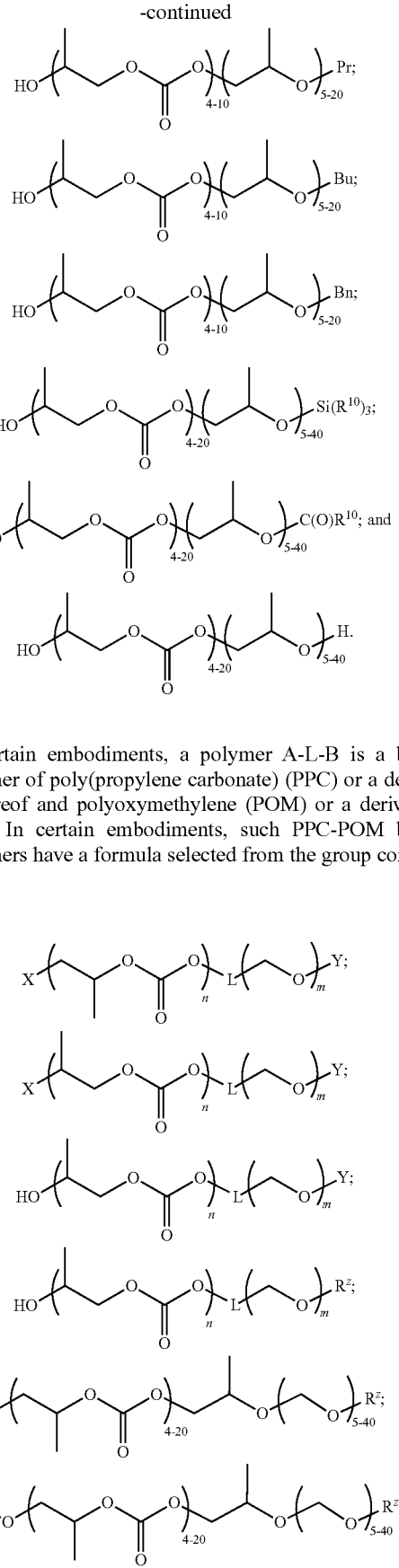
In certain embodiments, a polymer A-L-B is a block copolymer of poly(propylene carbonate) (PPC) or a derivative thereof and polyoxymethylene (POM) or a derivative thereof. In certain embodiments, such PPC-POM block copolymers have a formula selected from the group consisting of:
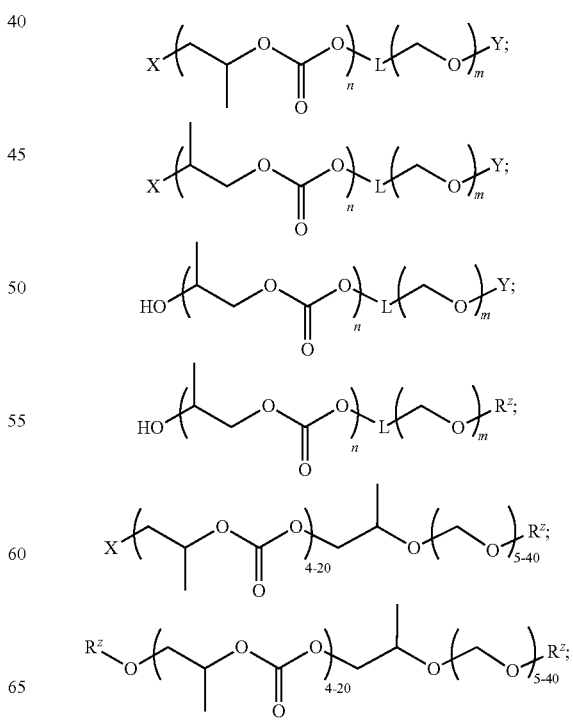

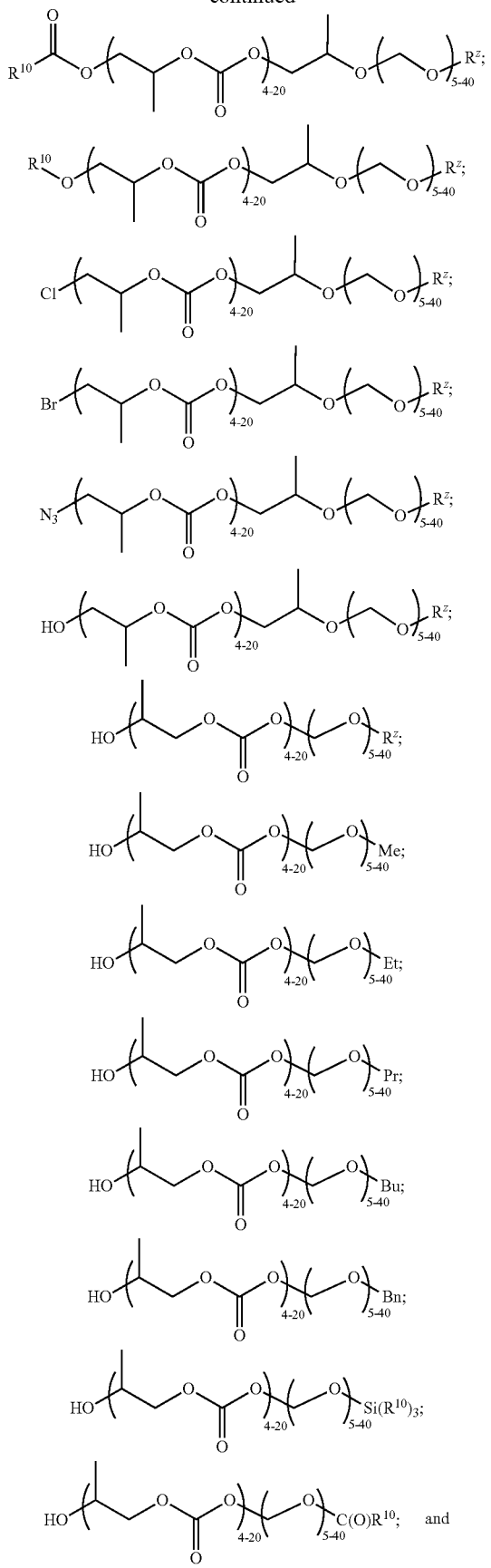

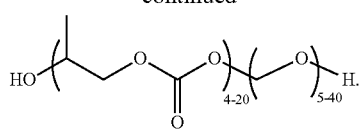

In certain embodiments, a polymer A-L-B is a block copolymer of poly(ethylene carbonate) (PEC) or a derivative thereof and poly(ethylene glycol) (PEG) or a derivative thereof. In certain embodiments, such PEC-PEG block copolymers have a formula selected from the group consisting of:

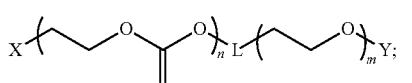

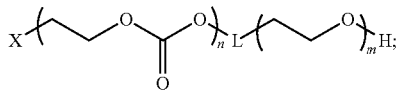

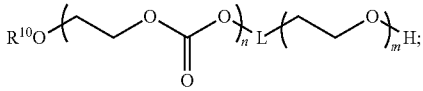

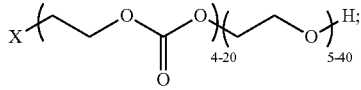

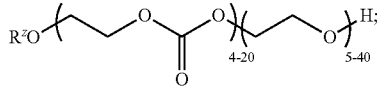

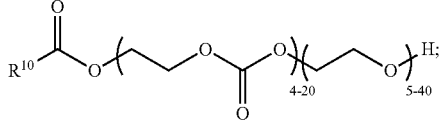

and

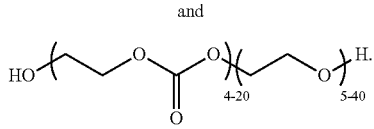

In certain embodiments, a polymer A-L-B is a block copolymer of poly(ethylene carbonate) (PEC) or a derivative thereof and polypropylene glycol (PPG) or a derivative thereof. In certain embodiments, such PEC-PPG block copolymers have a formula selected from the group consisting of:

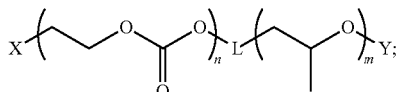

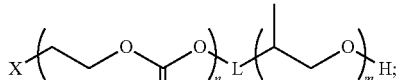

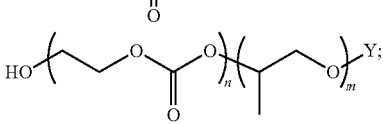

In certain embodiments, a polymer A-L-B is a block copolymer of poly(ethylene carbonate) (PEC) or a derivative thereof and polyoxymethylene (POM) or a derivative thereof. In certain embodiments, such PEC-POM block copolymers have a formula selected from the group consisting of:

In certain embodiments, a polymer A-L-B is a block copolymer of an aliphatic polycarbonate (APC) and a polyether, wherein the APC comprises a random copolymer such as those derived from copolymerization of two or more different epoxides and carbon dioxide. In certain embodiments, such block copolymers comprise PEG (poly(ethylene glycol)), polypropylene glycol), or polyoxymethylene.

In certain embodiments, APC-PEG block copolymers have a formula selected from the group consisting of:

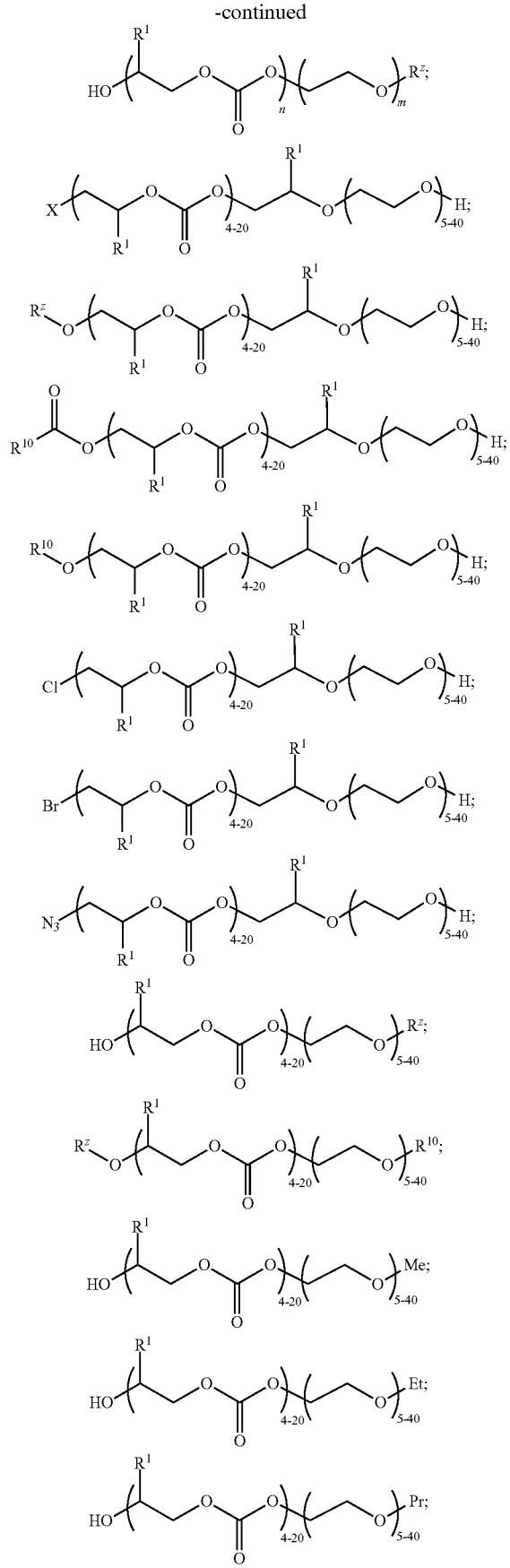
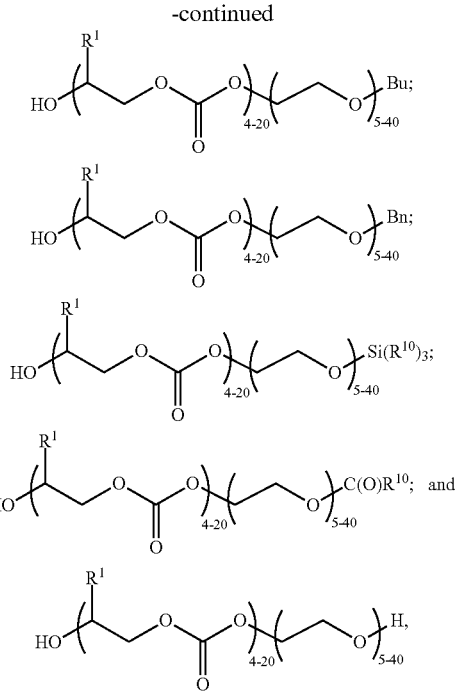

and, wherein $R^1$ is a mixture of two or more moieties selected from the group consisting of —H, methyl, ethyl, $C_{3-30}$ alkyl, $CH_2Cl$, $CF_3$, and $CH_2OR^z$.

In certain embodiments, $R^1$ is a mixture of methyl and ethyl groups. In some embodiments, $R^1$ is a mixture of —H and methyl groups. In certain embodiments, $R^1$ is a mixture of methyl groups and $C_{3-6}$ alkyl groups. In certain embodiments, $R^1$ is a mixture of methyl groups and $C_{6-24}$ alkyl groups.

In certain embodiments, a polymer A-L-B is a block copolymer of an aliphatic polycarbonate (APC) and poly(propylene glycol) (PPG) or a derivative thereof, wherein the APC comprises a random copolymer such as those derived from copolymerization of two or more different epoxides and carbon dioxide. In certain embodiments, such APC-PPG block copolymers have a formula selected from the group consisting of:

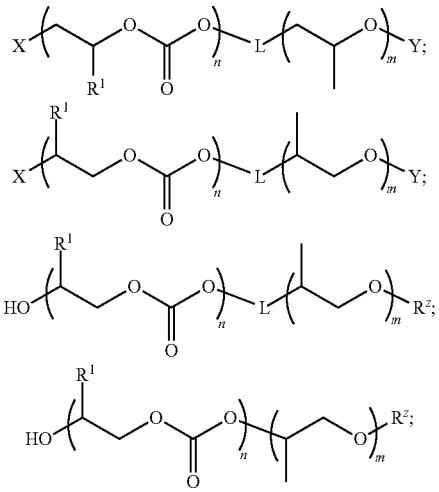

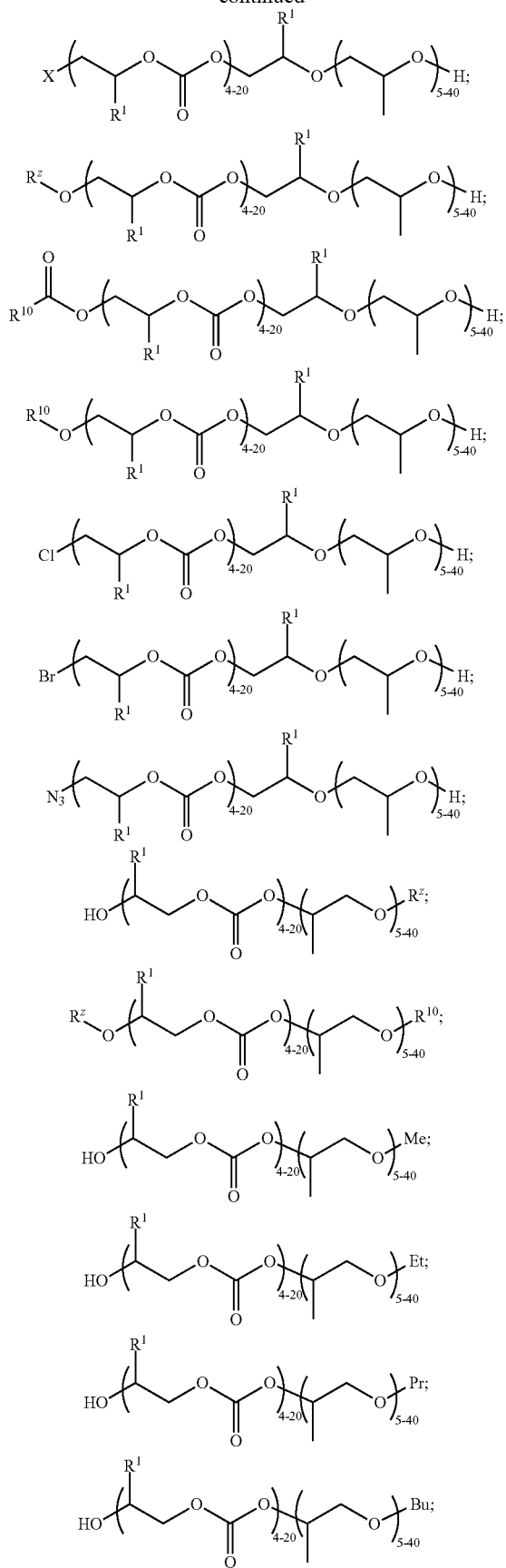

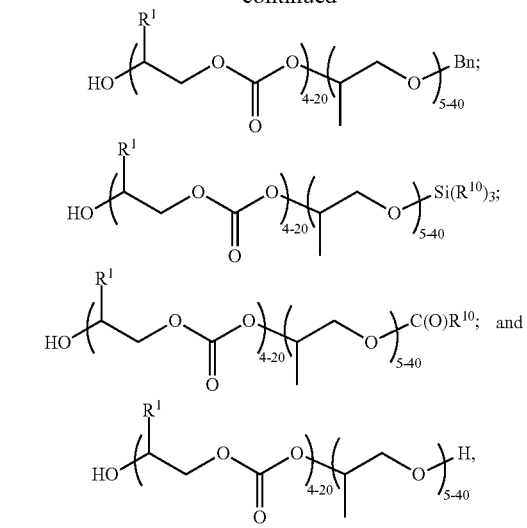

and, wherein $R^1$ is a mixture of two or more moieties selected from the group consisting of —H, methyl, ethyl, $C_{3-30}$ alkyl, $CH_2Cl$, $CF_3$, and $CH_2OR^z$. In certain embodiments, $R^1$ is a mixture of methyl and ethyl groups. In other embodiments, $R^1$ is a mixture of —H and methyl groups. In certain embodiments, $R^1$ is a mixture of methyl groups and $C_{3-6}$ alkyl groups. In certain embodiments, $R^1$ is a mixture of methyl groups and $C_{6-24}$ alkyl groups.

In certain embodiments, polymers of the present invention encompass triblock copolymers having a hydrophilic central block flanked by two polycarbonate chains. In certain embodiments, such triblock copolymers have the formula A-B-A, where each A is a polycarbonate or polyethercarbonate chain having from about 3 to about 500 repeating units and -B- is a hydrophilic oligomer having from about 4 to about 200 repeating units.

In certain embodiments, A-B-A triblock copolymers have the formula X:

(X)

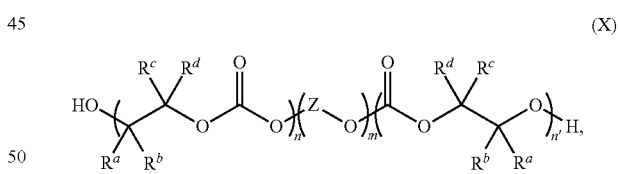

where $R^a$, $R^b$, $R^c$, $R^d$, n, Z, and m are as defined above, and where n' is, on average approximately equal to n.

In certain embodiments, A-B-A triblock copolymers have the formula X-a:

(X-a)

where $R^z$, $R^a$, $R^b$, $R^c$, $R^d$, n, m, and n' are as defined above.

In certain embodiments, A-B-A triblock copolymers have the formula X-b:

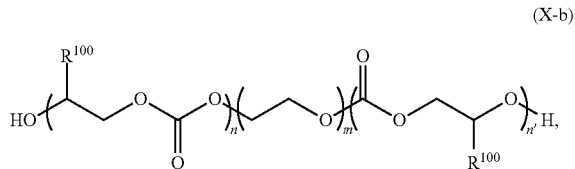
(X-b)

where $R^{100}$, n, n', and m are as defined above.

In certain embodiments, A-B-A triblock copolymers have the formula X-c:

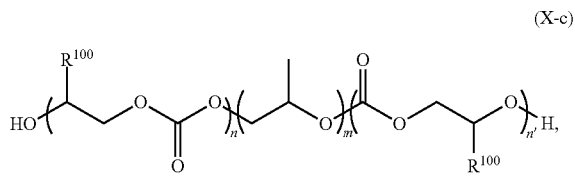
(X-c)

where $R^{100}$, n, n', and m are as defined above.

In certain embodiments, A-B-A triblock copolymers have the formula X-d:

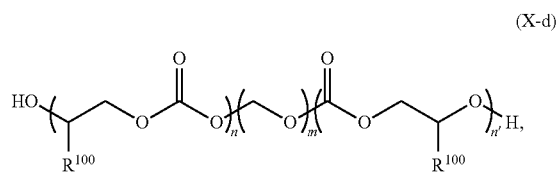
(X-d)

where $R^{100}$, n, n', and m are as defined above.

In certain embodiments, A-B-A triblock copolymers have the formula X-e:

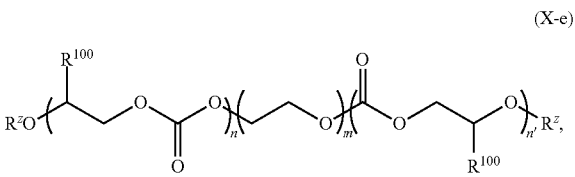
(X-e)

where $R^z$, $R^{100}$, n, n', and m are as defined above.

In certain embodiments, in polymers of formulae X-a or X-e, $R^z$ is $R^{10}$. In certain embodiments, in polymers of formulae X-a or X-e, $R^z$ is an optionally substituted aliphatic group. In certain embodiments, $R^z$ is selected from the group consisting of methyl, ethyl, n-propyl, i-propyl, n-butyl, sec-butyl, t-butyl, allyl and benzyl. In certain embodiments, in polymers of formulae X-a or X-e, $R^z$ is an acyl group. In certain embodiments, $R^z$ is selected from the group consisting of formate, acetate, trifluoroacetate, propionate, and optionally substituted benzoate. In certain embodiments, in polymers of formulae X-a or X-e, $R^z$ is $-Si(R^{10})_3$. In certain embodiments, in polymers of formulae X-a or X-e, $R^z$ is a silyl group. In certain embodiments, $R^z$ is selected from the group consisting of trimethylsilyl, triethylsilyl, triisopropyl silyl, t-butyldimethylsilyl, and t-butyldiphenylsilyl. In certain embodiments, in polymers of formulae X-a or X-e, $R^z$ is a sulfonate group.

In certain embodiments, in polymers of formulae X-b through X-e, $R^{100}$ is absent (e.g. the polycarbonate chain comprises poly(ethylene carbonate). In certain embodiments, in polymers of formulae X-b through X-e, $R^{100}$ is a methyl group. In certain embodiments, in polymers of formulae X-b through X-e, $R^{100}$ is an ethyl group. In certain embodiments, in polymers of formulae X-b through X-e, $R^{100}$ is a random mixture of methyl and ethyl groups. In certain embodiments, in polymers of formulae X-b through X-e, $R^{100}$ is a chloromethyl group. In certain embodiments, in polymers of formulae X-b through X-e, $R^{100}$ is a random mixture of methyl and chloromethyl groups. In certain embodiments, in polymers of formulae X-b through X-e, $R^{100}$ is a random mixture of methyl and one or more $C_{3-30}$ alkyl groups.

In certain embodiments, in polymers of formulae X-b through X-e, $R^{100}$ is a $-CH_2OR^z$ group. In certain embodiments, the $CH_2OR^z$ group comprises an ether group (e.g. the polycarbonate chain is a poly(glycidyl ether carbonate)). In some embodiments, the $CH_2OR^z$ group comprises an ester group (e.g. the polycarbonate chain is a poly(glycidyl ester carbonate)). In certain embodiments, $R^{100}$ is a random mixture of $-H$ and $-CH_2OR^z$ groups. In certain embodiments, $R^{100}$ is a random mixture of $C_{1-4}$ alkyl groups and $-CH_2OR^z$ groups. In certain embodiments, $R^{100}$ is a random mixture of methyl and $-CH_2OR^z$ groups.

In certain embodiments, provided polymer compositions comprise polymer chains of formulae X through X-e, wherein the value of n is, on average, between about 3 and about 200. In certain embodiments, the value of n is, on average between about 3 and about 100. In certain embodiments, the value of n is, on average between about 3 and about 50. In certain embodiments, the value of n is, on average between about 3 and about 25. In certain embodiments, the value of n is, on average between about 10 and about 20. In certain embodiments, the value of n is, on average between about 3 and about 10.

In certain embodiments, provided polymer compositions comprise polymer chains of formulae X through X-e above wherein the value of m is, on average, between about 4 and about 500. In certain embodiments, the value of m is, on average between about 5 and about 200. In certain embodiments, the value of m is, on average between about 5 and about 50. In certain embodiments, the value of m is, on average between about 5 and about 25. In certain embodiments, the value of m is, on average between about 10 and about 20. In certain embodiments, the value of n is, on average between about 5 and about 10.

In certain embodiments, where a provided polymer has one of the formulae X-b through X-e, the head to tail ratio of adjacent

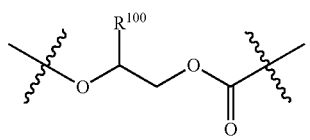

groups is greater than about 80%. In certain embodiments, the head to tail ratio is greater than about 90%. In certain embodiments, the head to tail ratio is greater than about 92%. In certain embodiments, the head to tail ratio is greater than about 95%.

In certain embodiments, provided A-B-A copolymers have narrow polydisperisity indices. In some embodiments, the PDI of block copolymers of the present invention is less than about 2. In certain embodiments, the PDI is less than 1.5. In some embodiments, the PDI is less than 1.4, less than 1.2 or less than about 1.1.

In certain embodiments, triblock copolymers of the present invention comprise copolymers of poly(ethylene glycol) (PEG) or a derivative thereof and polypropylene carbonate) (PPC) or derivatives thereof. In certain embodiments, these copolymers have a formula selected from the group consisting of:

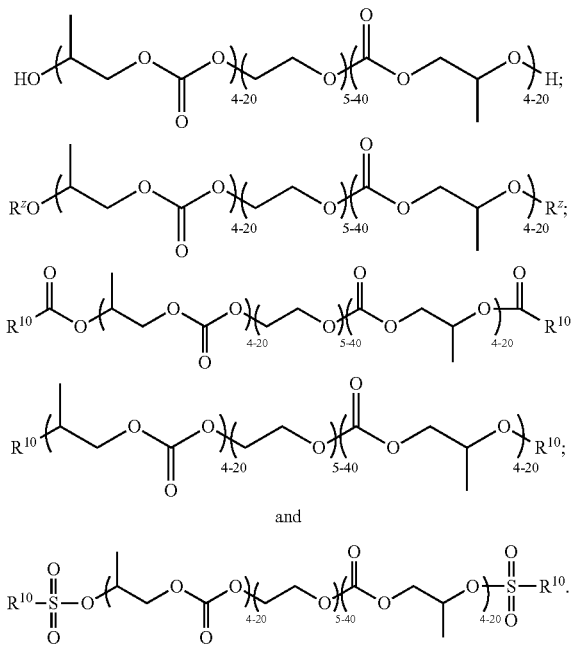

and

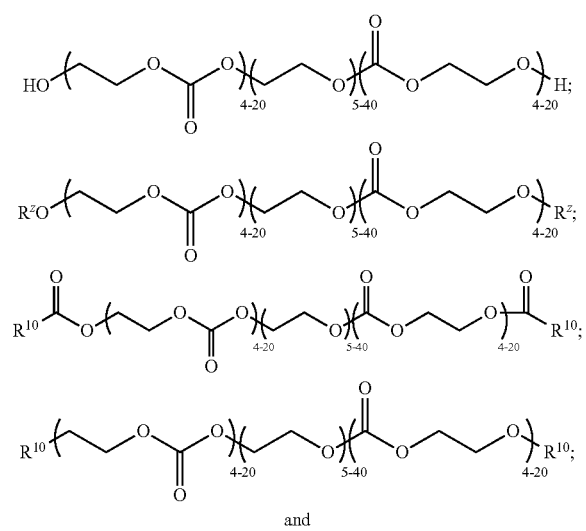

In certain embodiments, provided triblock copolymers comprise copolymers of poly(ethylene glycol) (PEG) or a derivative thereof and poly(ethylene carbonate) (PEC) or derivatives thereof. In certain embodiments, these PEG-PEC triblock copolymers have a formula selected from the group consisting of:

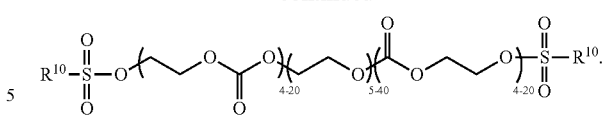

and

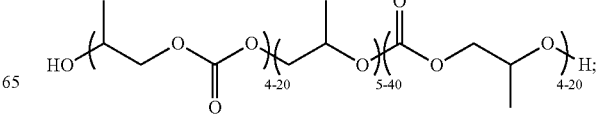

In certain embodiments, provided triblock copolymers comprise copolymers of an aliphatic polycarbonate (APC) and poly(ethylene glycol) (PEG) or a derivative thereof, wherein an APC comprises a random copolymer such as those derived from copolymerization of two or more different epoxides and carbon dioxide. In certain embodiments, such APC-PEG triblock copolymers have a formula selected from the group consisting of:

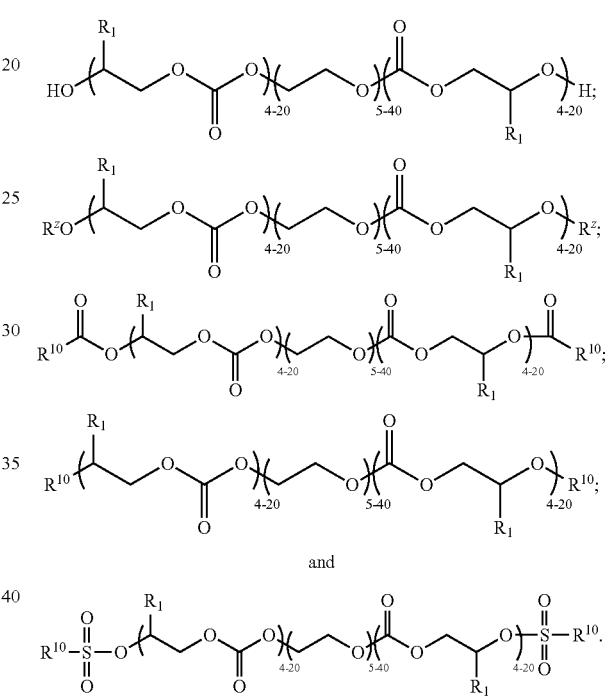

wherein $R^1$ is a mixture of two or more moieties selected from the group consisting of —H, methyl, ethyl, $C_{3-30}$ alkyl, $CH_2Cl$, $CF_3$, and $CH_2OR^z$. In certain embodiments, $R^1$ is a mixture of methyl and ethyl groups. In other embodiments, $R^1$ is a mixture of —H and methyl groups. In certain embodiments, $R^1$ is a mixture of methyl groups and $C_{3-6}$ alkyl groups. In certain embodiments, $R^1$ is a mixture of methyl groups and $C_{6-24}$ alkyl groups.

In certain embodiments, provided triblock copolymers comprise copolymers of poly(propylene glycol) (PPG) or a derivative thereof and poly(propylene carbonate) (PPC) or derivatives thereof. In certain embodiments, such copolymers have a formula selected from the group consisting of:

-continued

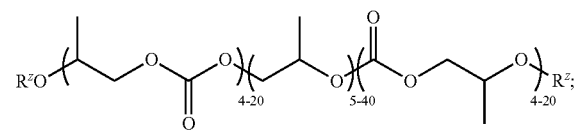

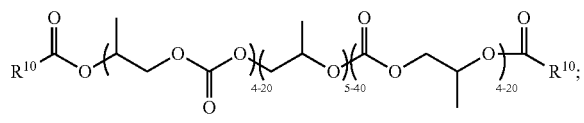

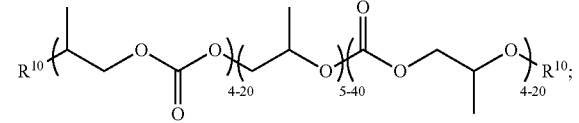

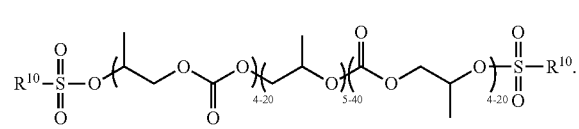

In certain embodiments, provided triblock copolymers comprise copolymers of polypropylene glycol) (PPG) or a derivative thereof and poly(ethylene carbonate) (PEC) or derivatives thereof. In certain embodiments, these PPG-PEC triblock copolymers have a formula selected from the group consisting of:

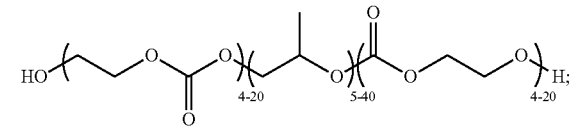

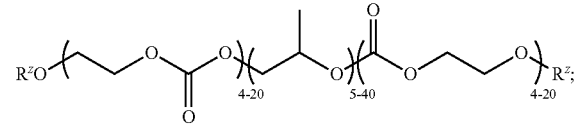

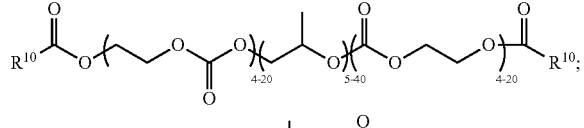

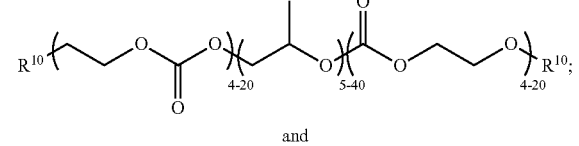

and

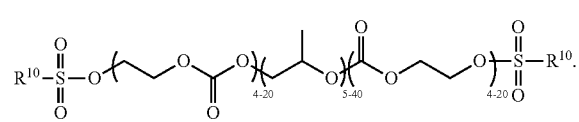

In certain embodiments, provided triblock copolymers comprise copolymers of an aliphatic polycarbonate (APC) and polypropylene glycol) (PPG) or a derivative thereof, wherein the APC comprises a random copolymer such as those derived from copolymerization of two or more different epoxides and carbon dioxide. In certain embodiments, such APC-PPG triblock copolymers have a formula selected from the group consisting of:

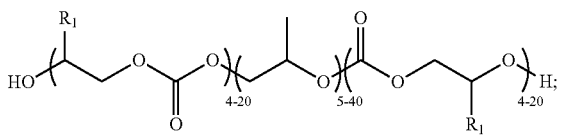

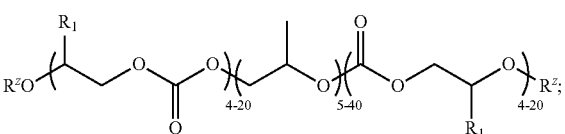

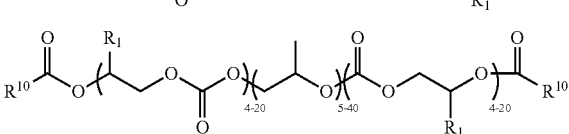

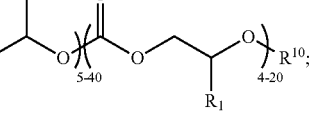

and

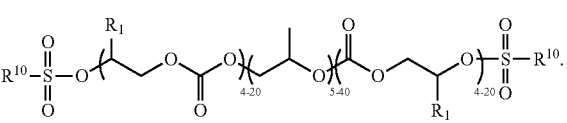

wherein, $R^1$ is a mixture of two or more moieties selected from the group consisting of —H, methyl, ethyl, $C_{3-30}$ alkyl, $CH_2Cl$, $CF_3$, and $CH_2OR^z$. In certain embodiments, $R^1$ is a mixture of methyl and ethyl groups. In other embodiments, $R^1$ is a mixture of —H and methyl groups. In certain embodiments, $R^1$ is a mixture of methyl groups and $C_{3-6}$ alkyl groups. In certain embodiments, $R^1$ is a mixture of methyl groups and $C_{6-24}$ alkyl groups.

In certain embodiments, provided triblock copolymers comprise copolymers of polyoxymethylene (POM) or a derivative thereof and poly(propylene carbonate) (PPC) or derivatives thereof. In certain embodiments, such copolymers have a formula selected from the group consisting of:

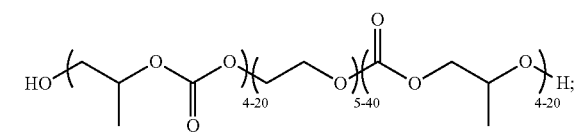

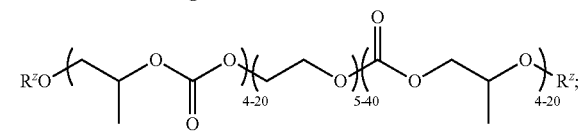

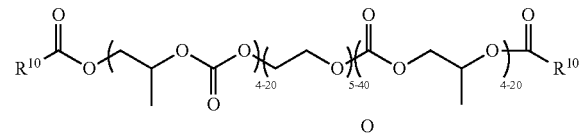

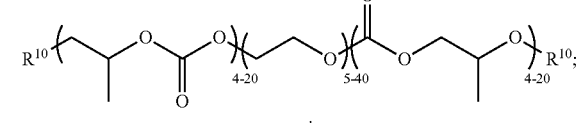

and

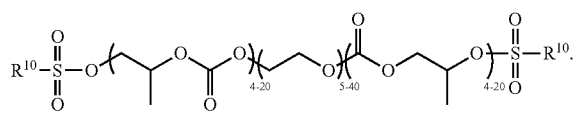

In certain embodiments, provided triblock copolymers comprise copolymers of polyoxymethylene (POM) or a derivative thereof and poly(ethylene carbonate) (PEC) or derivatives thereof. In certain embodiments, these POM-PEC triblock copolymers have a formula selected from the group consisting of:

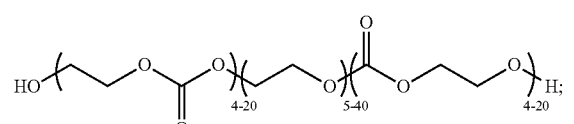

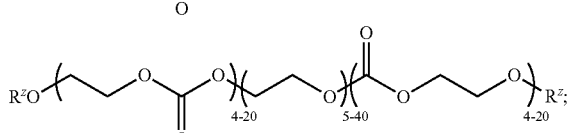

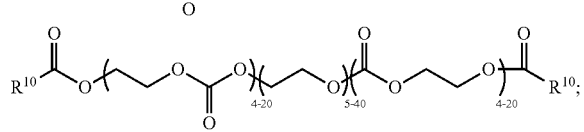

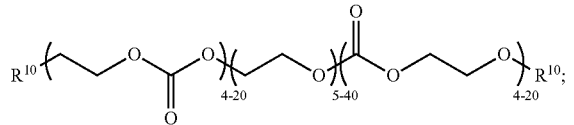

and

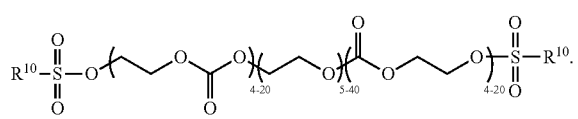

In certain embodiments, provided triblock copolymers comprise copolymers of an aliphatic polycarbonate (APC) and polyoxymethylene (POM) or a derivative thereof, wherein an APC comprises a random copolymer such as those derived from copolymerization of two or more different epoxides and carbon dioxide. In certain embodiments, such APC-POM triblock copolymers have a formula selected from the group consisting of:

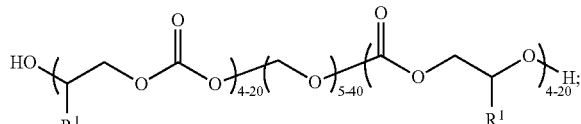

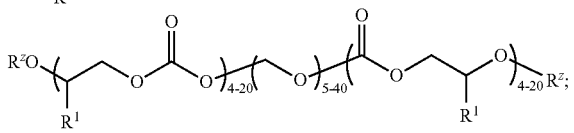

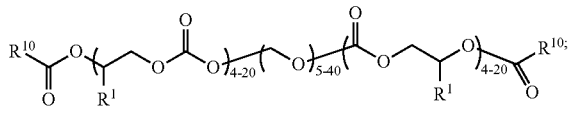

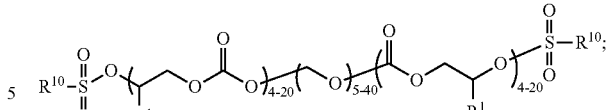

and

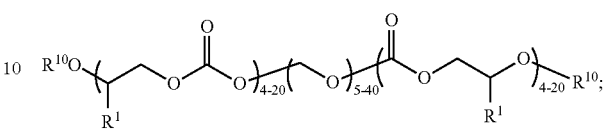

wherein,
$R^1$ is a mixture of two or more moieties selected from the group consisting of —H, methyl, ethyl, $C_{3-30}$ alkyl, $CH_2Cl$, $CF_3$, and $CH_2OR^z$. In certain embodiments, $R^1$ is a mixture of methyl and ethyl groups. In other embodiments, $R^1$ is a mixture of —H and methyl groups. In certain embodiments, $R^1$ is a mixture of methyl groups and $C_{3-6}$ alkyl groups. In certain embodiments, $R^1$ is a mixture of methyl groups and $C_{6-24}$ alkyl groups.

In certain embodiments, provided polymers are triblock copolymers having an aliphatic polycarbonate central block flanked by two hydrophilic oligomers. In certain embodiments, such triblock copolymers have the formula B-A-B, where -A- is a polycarbonate or polyethercarbonate chain having from about 3 to about 500 repeating units and each B is independently a hydrophilic oligomer having from about 4 to about 200 repeating units.

In certain embodiments, such B-A-B triblock copolymers have the formula XI:

(XI)

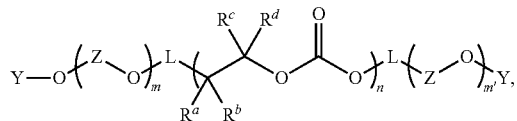

where $R^a$, $R^b$, $R^c$, $R^d$, n, L, Z, Y, and m are as defined above, and where m' is, on average approximately equal to m.

In certain embodiments, B-A-B triblock copolymers have the formula XI-a:

(XI-a)

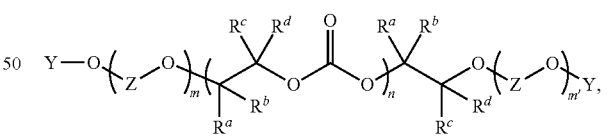

where Y, Z, $R^a$, $R^b$, $R^c$, $R^d$, n, m, and m' are as defined above.

In certain embodiments, B-A-B triblock copolymers have the formula XI-b:

(XI-b)

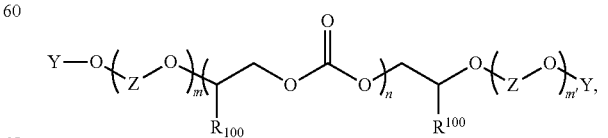

where Y, Z, $R^{100}$, n, m', and m are as defined above.

In certain embodiments, B-A-B triblock copolymers have the formula XI-c:

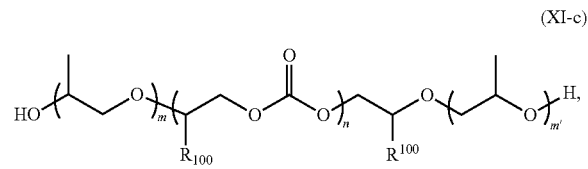
(XI-c)

where $R^{100}$, n, m', and m are as defined above.

In certain embodiments, B-A-B triblock copolymers have the formula XI-d:

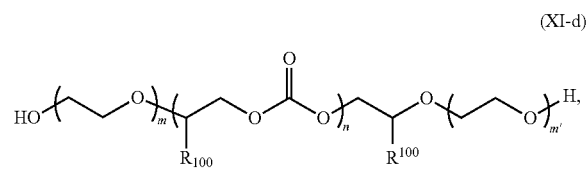
(XI-d)

where $R^{100}$, n, m', and m are as defined above.

In certain embodiments, in polymers of formulae XI through XI-b, Y is —H. In certain embodiments, in polymers of formulae XI through XI-b, Y is an optionally substituted aliphatic group. In certain embodiments, Y is selected from the group consisting of methyl, ethyl, n-propyl, i-propyl, n-butyl, sec-butyl, t-butyl, allyl and benzyl. In certain embodiments, in polymers of formulae XI through XI-b, Y is an acyl group. In certain embodiments, Y is selected from the group consisting of formate, acetate, trifluoroacetate, propionate, and optionally substituted benzoate. In certain embodiments, in polymers of formulae XI through XI-b, Y is —Si$(R^{10})_3$. In certain embodiments, in polymers of formulae XI through XI-b, Y is a silyl group. In certain embodiments, Y is selected from the group consisting of trimethylsilyl, triethylsilyl, triisopropyl silyl, t-butyldimethylsilyl, and t-butyldiphenylsilyl. In certain embodiments, in polymers of formulae XI through XI-b, Y is a sulfonate group.

In certain embodiments, in polymers of formulae XI-b through XI-d, $R^{100}$ is absent (e.g. the polycarbonate chain comprises poly(ethylene carbonate)). In certain embodiments, in polymers of formulae XI-b through XI-d, $R^{100}$ is a methyl group. In certain embodiments, in polymers of formulae XI-b through XI-d, $R^{100}$ is an ethyl group. In certain embodiments, in polymers of formulae XI-b through XI-d, $R^{100}$ is a random mixture of methyl and ethyl groups. In certain embodiments, in polymers of formulae XI-b through XI-d, $R^{100}$ is a chloromethyl group. In certain embodiments, in polymers of formulae XI-b through XI-d, $R^{100}$ is a random mixture of methyl and chloromethyl groups. In certain embodiments, in polymers of formulae XI-b through XI-d, $R^{100}$ is a random mixture of methyl and one or more $C_{3-30}$ alkyl groups.

In certain embodiments, in polymers of formulae XI-b through XI-d, $R^{100}$ is a —$CH_2OR^z$ group. In certain embodiments, a $CH_2OR^z$ group comprises an ether group (e.g. the polycarbonate chain is a poly(glycidyl ether carbonate)). In some embodiments, a $CH_2OR^z$ group comprises an ester group (e.g. the polycarbonate chain is a poly(glycidyl ester carbonate)). In certain embodiments, $R^{100}$ is a random mixture of —H and —$CH_2OR^z$ groups. In certain embodiments, $R^{100}$ is a random mixture of $C_{1-4}$ alkyl groups and —$CH_2OR^z$ groups. In certain embodiments, $R^{100}$ is a random mixture of methyl and —$CH_2OR^z$ groups.

In certain embodiments, provided polymer compositions comprise polymer chains of formulae XI through XI-d above wherein the value of n is, on average, between about 3 and about 200. In certain embodiments, the value of n is, on average between about 3 and about 100. In certain embodiments, the value of n is, on average between about 3 and about 50. In certain embodiments, the value of n is, on average between about 3 and about 25. In certain embodiments, the value of n is, on average between about 10 and about 20. In certain embodiments, the value of n is, on average between about 3 and about 10.

In certain embodiments, provided polymer compositions comprise polymer chains of formulae XI through XI-d above wherein the value of m is, on average, between about 4 and about 500. In certain embodiments, the value of m is, on average between about 5 and about 200. In certain embodiments, the value of m is, on average between about 5 and about 50. In certain embodiments, the value of m is, on average between about 5 and about 25. In certain embodiments, the value of m is, on average between about 10 and about 20. In certain embodiments, the value of n is, on average between about 5 and about 10.

In certain embodiments, where the polymer has one of the formulae XI-b through XI-d, $R^{100}$ is present, and the head to tail ratio of adjacent

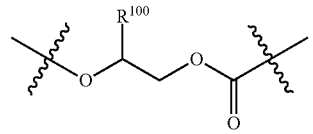

groups is greater than about 80%. In certain embodiments, the head to tail ratio is greater than about 90%. In certain embodiments, the head to tail ratio is greater than about 92%. In certain embodiments, the head to tail ratio is greater than about 95%.

In certain embodiments, copolymers B-A-B have narrow polydisperisity indices. In some embodiments, the PDI of provided block copolymers is less than about 2. In certain embodiments, the PDI is less than 1.5. In some embodiments, the PDI is less than 1.4, less than 1.2 or less than about 1.1.

In certain embodiments, for each of the formulae described herein, $R^{10}$ is optionally substituted $C_{1-20}$ aliphatic. In some embodiments, $R^{10}$ is $C_{1-12}$ heteroaliphatic. In some embodiments, $R^{10}$ is 6- to 14-membered aryl. In some embodiments, $R^{10}$ is 5- to 14-membered heteroaryl. In some embodiments, $R^{10}$ is $C_{1-12}$ heteroaliphatic. In some embodiments, $R^{10}$ is methyl.

Polyether-Polycarbonates

In certain embodiments, provided copolymers are amphiphilic block copolymers wherein the carbonate-containing portion of the polymer comprises a polycarbonate containing both carbonate and ether linkages. In certain embodiments, a polymer A-L-B comprises a random poly (ether-co-carbonate) and has the formula VI:

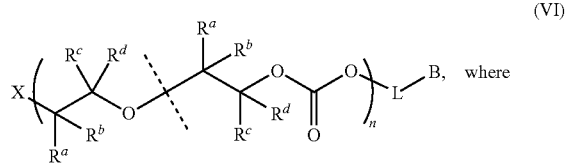
(VI)

X, B, $R^a$, $R^b$, $R^c$, $R^d$, L, and n are as defined above.

It will be appreciated that in chemical formulae described herein, a dashed line " \ " means that the repeating unit on either side of the line occurs randomly throughout the polymer block contained within the parentheses between which the dashed line appears.

In certain embodiments, a polymer A-L-B has the formula VI-a:

(VI-a)

where X, L, B, $R^{100}$, and n are as defined above.

In certain embodiments, a polymer A-L-B has the formula VII:

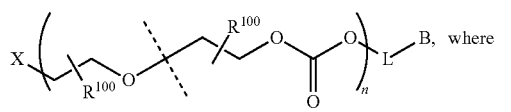
(VII)

where X, L, $R^{100}$, n and m are as defined above.

In certain embodiments, a polymer A-L-B has the formula VII-a:

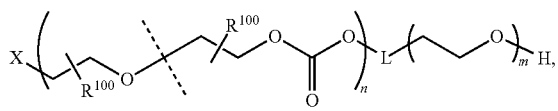
(VII-a)

where X, $R^{100}$, n and m are as defined above.

In certain embodiments, a polymer A-L-B has the formula VII-b:

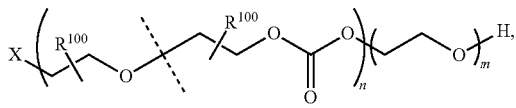
(VII-b)

where X, n and m are as defined above.

In certain embodiments, a polymer A-L-B has the formula VII-c:

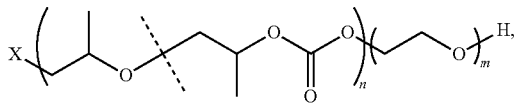
(VII-c)

where X, n and m are as defined above.

In certain embodiments, a polymer A-L-B has the formula VII-d:

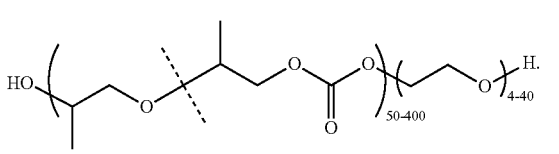
(VII-d)

In certain embodiments, a polymer A-L-B has the formula VII-e:

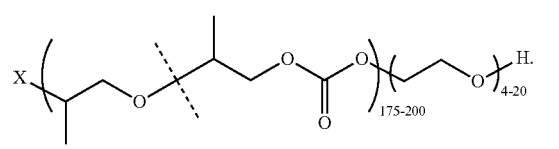
(VII-e)

In certain embodiments, a polymer A-L-B has the formula VII-f:

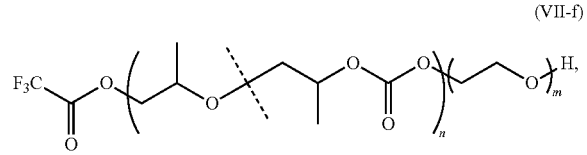
(VII-f)

where n and m are as defined above.

In certain embodiments, a polymer A-L-B has the formula VII-g:

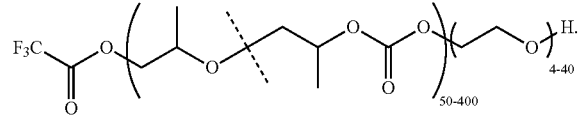
(VII-g)

In certain embodiments, a polymer A-L-B has the formula VII-h:

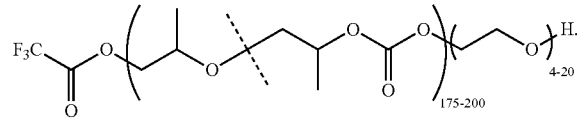
(VII-h)

In certain embodiments, a polymer A-L-B has the formula VII-i:

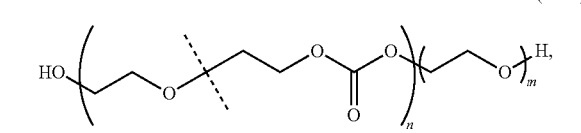
(VII-i)

where n and m are as defined above.

In certain embodiments, a polymer A-L-B has the formula VII-j:

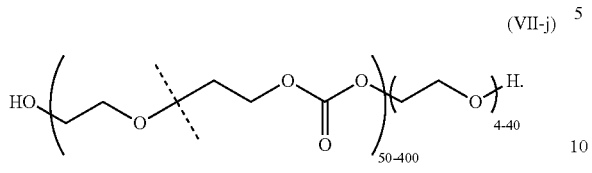
(VII-j)

In certain embodiments, a polymer A-L-B has the formula VII-k:

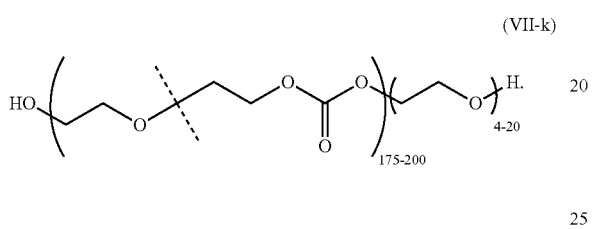
(VII-k)

In certain embodiments, a polymer A-L-B has the formula VIII:

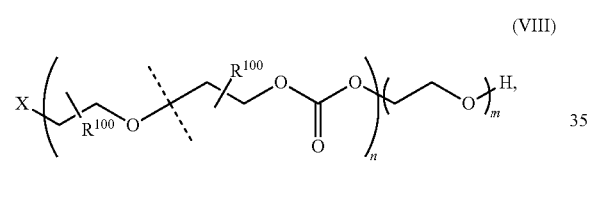
(VIII)

where X, L, $R^{100}$, n and m are as defined above.

In certain embodiments, a polymer A-L-B has the formula VIII-a:

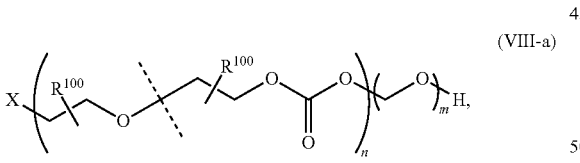
(VIII-a)

where X, $R^{100}$, n and m are as defined above.

In certain embodiments, a polymer A-L-B has the formula VIII-b:

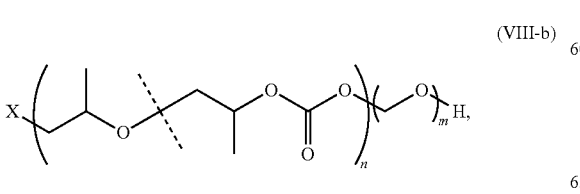
(VIII-b)

where X, n and m are as defined above.

In certain embodiments, a polymer A-L-B has the formula VIII-c:

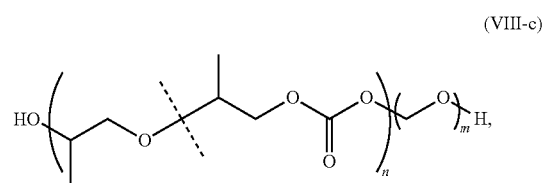
(VIII-c)

where n and m are as defined above.

In certain embodiments, a polymer A-L-B has the formula VIII-d:

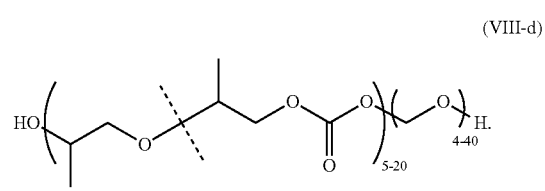
(VIII-d)

In certain embodiments, a polymer A-L-B has the formula VIII-e:

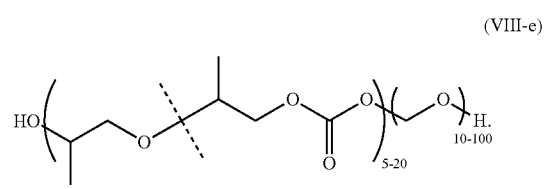
(VIII-e)

In certain embodiments, a polymer A-L-B has the formula VIII-f:

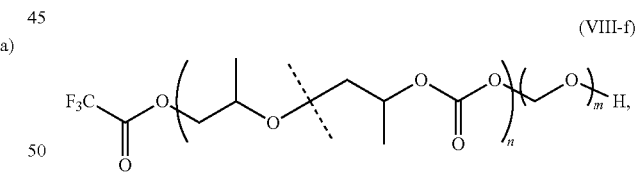
(VIII-f)

where n and m are as defined above.

In certain embodiments, a polymer A-L-B has the formula VIII-g:

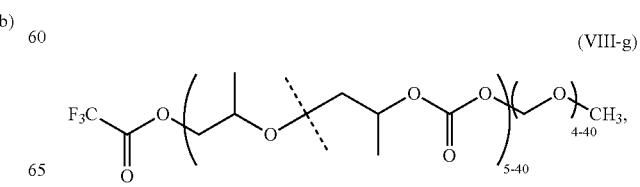
(VIII-g)

In certain embodiments, a polymer A-L-B has the formula VIII-h:

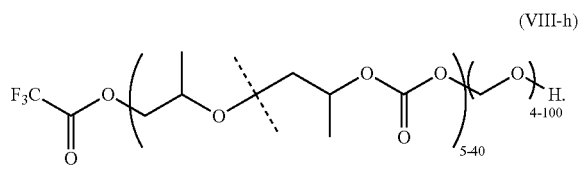

In certain embodiments, a polymer A-L-B has the formula IX:

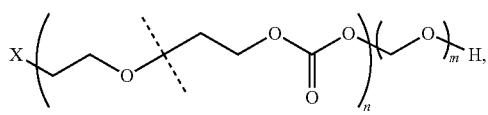

where X, n and m are as defined above.

In certain embodiments, a polymer A-L-B has the formula IX-a:

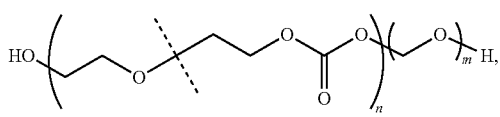

where n and m are as defined above.

In certain embodiments, a polymer A-L-B has the formula IX-b:

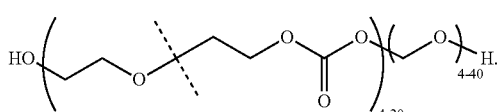

In certain embodiments, a polymer A-L-B has the formula IX-c:

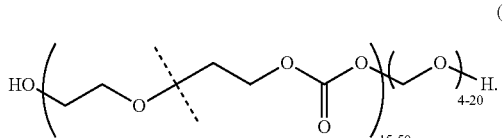

In certain embodiments, a polymer A-L-B has the formula IX-d:

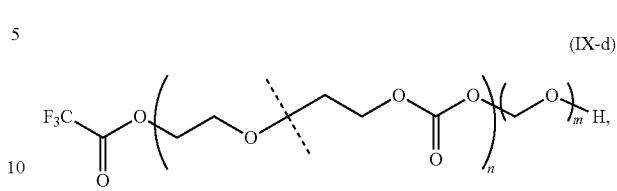

where n and m are as defined above.

In certain embodiments, a polymer A-L-B has the formula IX-e:

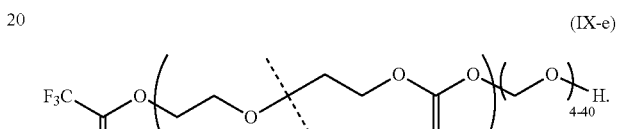

In certain embodiments, a polymer A-L-B has the formula IX-f:

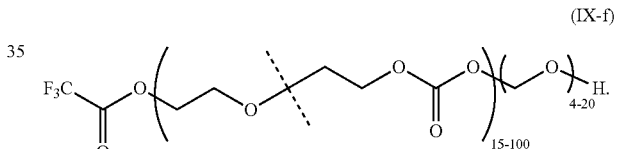

In certain embodiments, provided triblock copolymers have the formula A-B-A wherein A is a polycarbonate chain containing both carbonate and ether linkages has the formula (IX-g):

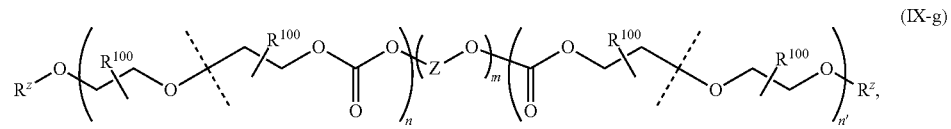

where $R^z$, $R^{100}$, Z, n, n' and m are as defined above.

As mentioned above, in some embodiments, provided copolymers have a high percentage of carbonate linkages and a low percentage of ether linkages. In certain embodiments, for copolymers of formulae VI through IX-g, the proportion of ether linkages in the polyethercarbonate is less than about 50%. In certain embodiments, for copolymers of formulae VI through IX-g, the proportion of ether linkages in the polyethercarbonate is less than about 46%. In certain embodiments, for copolymers of formulae VI through IX-g, the proportion of ether linkages in the polyethercarbonate is less than about 40%. In certain embodiments, for copolymers of formulae VI through IX-g, the proportion of ether linkages in the polyethercarbonate is less than about 30%. In certain embodiments, for copolymers of formulae VI through IX-g, the proportion of ether linkages in the polyethercarbonate is less than about 20%. In certain embodiments, for copolymers of formulae VI through IX-g, the proportion of ether linkages in the polyethercarbonate is less than about 10%. In certain embodiments, for copolymers of formulae VI through IX-g, the proportion of ether linkages in the polyethercarbonate is less than about 5%. In certain embodiments, for copolymers of formulae VI through IX-g, the proportion of ether linkages in the polyethercarbonate is less than about 1%. In certain embodiments, for copolymers of formulae VI through IX-g, the proportion of ether linkages in the polyethercarbonate is less than about 0.1%.

In some embodiments, provided polymer compositions have an average molecular weight between 200 and 10,000 g/mol. In some embodiments, provided polymer compositions have an average molecular weight between 200 and 5,000 g/mol. In some embodiments, provided polymer compositions have an average molecular weight between 500 and 2,500 g/mol. In some embodiments, provided polymer compositions have an average molecular weight between 800 and 2,000 g/mol. In some embodiments, provided polymer compositions have an average molecular weight between 500 and 1,000 g/mol. In some embodiments, provided polymer compositions have an average molecular weight between 1,000 and 2,000 g/mol. In some embodiments, provided polymer compositions have an average molecular weight between 1,000 and 5,000 g/mol. In some embodiments, provided polymer compositions have an average molecular weight between 200 and 1,000 g/mol.

In certain embodiments, a block copolymer is provided in a quantity of less than 5 weight % relative to the $CO_2$ phase. In certain embodiments, the block copolymer is provided in a quantity of less than 1 weight %. In certain embodiments, the block copolymer is provided in a quantity of less than 0.5 weight %. In certain embodiments, the block copolymer is provided in a quantity of less than 0.1 weight %. In certain embodiments, the block copolymer is provided in a quantity of less than 0.05 weight %. In certain embodiments, the block copolymer is provided in a quantity of about 0.01 weight %.

In some embodiments, a provided copolymer composition has a solubility in supercritical $CO_2$ of at least 0.01 weight % at a pressure of 4,000 psi or higher. In some embodiments, a provided copolymer composition has a solubility in supercritical $CO_2$ of at least 0.05 weight % at a pressure of 4,000 psi or higher. In some embodiments, a provided copolymer composition has a solubility in supercritical $CO_2$ of at least 0.1 weight % at a pressure of 4,000 psi or higher. In some embodiments, a provided copolymer composition has a solubility in supercritical $CO_2$ of at least 0.2 weight % at a pressure of 4,000 psi or higher. In some embodiments, a provided copolymer composition has a solubility in supercritical $CO_2$ of at least 0.5 weight % at a pressure of 4,000 psi or higher. In some embodiments, a provided copolymer composition has a solubility in supercritical $CO_2$ of at least 1.0 weight % at a pressure of 4,000 psi or higher. In some embodiments, a provided copolymer composition has a solubility in supercritical $CO_2$ of at least 0.01 weight % at a pressure of 3,000 psi or higher. In some embodiments, a provided copolymer composition has a solubility in supercritical $CO_2$ of at least 0.05 weight % at a pressure of 3,000 psi or higher. In some embodiments, a provided copolymer composition has a solubility in supercritical $CO_2$ of at least 0.1 weight % at a pressure of 3,000 psi or higher. In some embodiments, a provided copolymer composition has a solubility in supercritical $CO_2$ of at least 0.2 weight % at a pressure of 3,000 psi or higher. In some embodiments, a provided copolymer composition has a solubility in supercritical $CO_2$ of at least 0.5 weight % at a pressure of 3,000 psi or higher. In some embodiments, a provided copolymer composition has a solubility in supercritical $CO_2$ of at least 1.0 weight % at a pressure of 3,000 psi or higher. In some embodiments, a provided copolymer composition has a solubility in supercritical $CO_2$ of at least 0.01 weight % at a pressure of 2,000 psi or higher. In some embodiments, a provided copolymer composition has a solubility in supercritical $CO_2$ of at least 0.05 weight % at a pressure of 2,000 psi or higher. In some embodiments, a provided copolymer composition has a solubility in supercritical $CO_2$ of at least 0.1 weight % at a pressure of 2,000 psi or higher. In some embodiments, a provided copolymer composition has a solubility in supercritical $CO_2$ of at least 0.2 weight % at a pressure of 2,000 psi or higher. In some embodiments, a provided copolymer composition has a solubility in supercritical $CO_2$ of at least 0.5 weight % at a pressure of 2,000 psi or higher. In some embodiments, a provided copolymer composition has a solubility in supercritical $CO_2$ of at least 1.0 weight % at a pressure of 2,000 psi or higher. In some embodiments, a provided copolymer composition has a solubility in supercritical $CO_2$ of at least 0.01 weight % at a pressure of 1,000 psi or higher. In some embodiments, a provided copolymer composition has a solubility in supercritical $CO_2$ of at least 0.05 weight % at a pressure of 1,000 psi or higher. In some embodiments, a provided copolymer composition has a solubility in supercritical $CO_2$ of at least 0.1 weight % at a pressure of 1,000 psi or higher. In some embodiments, a provided copolymer composition has a solubility in supercritical $CO_2$ of at least 0.2 weight % at a pressure of 1,000 psi or higher. In some embodiments, a provided copolymer composition has a solubility in supercritical $CO_2$ of at least 0.5 weight % at a pressure of 1,000 psi or higher. In some embodiments, a provided copolymer composition has a solubility in supercritical $CO_2$ of at least 1.0 weight % at a pressure of 1,000 psi or higher.

In some embodiments, provided copolymers form polymersomes. Having read the present disclosure, one of ordinary skill in the art would be able to carry out routine experimentation to form polymersomes from provided amphiphilic copolymers. Using methods well known to the skilled artisan, parameters such as polymer concentration, solvent, temperature, and various physical means (e.g., shearing, dialysis, etc.) can be applied to achieve vesicle formation. Depending upon the desired use of the vesicle (e.g., drug delivery, viscosifying agent, etc.), the skilled artisan will select the appropriate copolymer to achieve the desired polymersome properties.

One of ordinary skill will also be familiar with a variety of characterization techniques that can be used to determine the degree of vesicle formation. For example, $T_m$, scanning electron microscopy, transmission electron microscopy, dynamic stress rheometer, and dynamic light scattering, to name but a few, are all routine techniques in characterizing polymersome vesicles. Further guidance can be found in U.S. Pat. Appl. Publication 2005/0215438.

Certain polymers of the present invention can be produced by copolymerization of carbon dioxide and epoxides using catalysts adapted from those disclosed in US Pat. Nos. 6,870, 004; and 7,304,172, in pending PCT application Nos. PCT/US09/56220, PCT/US09/54773, and in published PCT applications WO2008136591A1 and WO2008150033A1, the entirety of each of which is incorporated herein by reference.

In certain methods of the present invention, the methods include synthesizing a polymer by reacting an epoxide and carbon dioxide in the presence of a suitable catalyst and a polyether chain transfer agent having one free OH group as shown in Scheme 1:

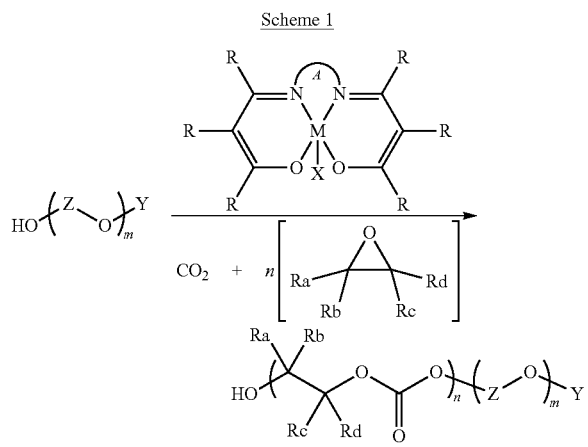

The method of Scheme 1 is suitable for the synthesis of compounds described above wherein the polyether moiety is capped with a Y group that is not —H, and the polycarbonate chain is terminated with an OH group. Experimental conditions and methods suitable for this process are described more fully in the Examples section below, and in co-pending International Patent Application No. PCT/US2009/056220, filed Sep. 8, 2009, the entire contents of which are hereby incorporated by reference.

The products of Scheme 1 can be further modified by reactions well known to those skilled in the art of organic synthesis such as alkylation, acylation, sulfonation, or silylation to yield compounds wherein the polycarbonate chain is capped with a non-OH end group. This is shown in Scheme 2:

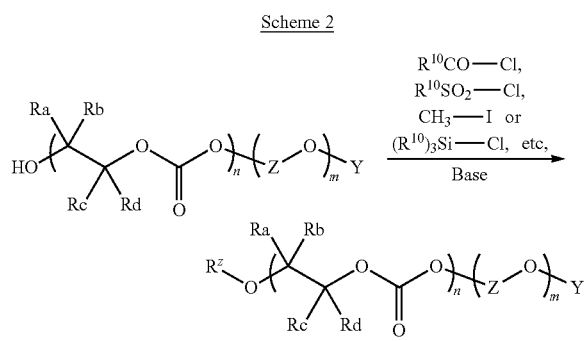

It will be appreciated that there are many possible variations encompassed by the synthetic approaches detailed in Schemes 1-5, including the choice of suitable protecting (capping) chemistries for the polymer termini. Suitable hydroxyl and carboxyl protecting groups are well known in the art and include those described in detail in *Protecting Groups in Organic Synthesis*, T. W. Greene and P. G. M. Wuts, 3$^{rd}$ edition, John Wiley & Sons, 1999, the entirety of which is incorporated herein by reference.

For example, where it is desired that the polyether portion of such polymers have a free OH group, the polyether chain transfer agent of Scheme 1 can be chosen to contain on one terminus a labile group that can be removed after construction of the block co-polymer. Exemplary approaches include the use of mono-benzyl or mono-allyl polyether starting material followed by hydrogenolysis of the benzyl or allyl ether after construction of the copolymer. Another viable approach is the use of a monosilylated polyether chain transfer agent followed by fluoride mediated cleavage of the silyl ether after construction of the copolymer. It will be appreciated that numerous other hydroxyl protecting groups that can be cleaved under relatively mild conditions are known in the art and can be used to similar effect in accordance with the present disclosure.

In certain embodiments, it is desirable to have a free —OH group on the hydrophilic polyether portion of the block co-polymer and a non-OH end-group on the polycarbonate. Polymers of this type can be produced using the methods just described by capping the —OH group of the polycarbonate as described above and shown in Scheme 2, followed by removal of a suitably chosen protecting group on the polyether block of the copolymer as just described.

For block copolymers comprising polycarbonates derived from monosubstituted epoxides, it will be appreciated that there are different regiochemical arrangements possible for the orientation of the polycarbonate chain relative to the polyether. For example, the two compounds shown below are both block co-polymers of PEG and polypropylene carbonate):

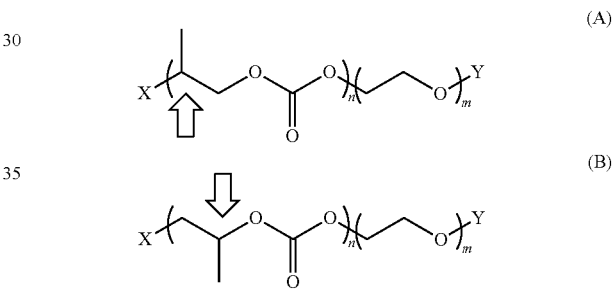

Compound (A) is typical of the product formed using the method shown in Scheme 1, where the epoxide is propylene oxide. The directionality of the epoxide enchainment during the polymerization will be predominately (>60%) from the less hindered ring carbon, therefore the last enchained epoxide which comprises the chain terminus at the end of synthesis will be oriented predominately as shown in the first structure. If one uses a complementary approach described below in Scheme 5, wherein a preformed monofunctional polycarbonate chain is ligated to a polyether chain, the regiochemistry will be predominantly as shown in structure (B) since a mono-hydroxy terminated polypropylene carbonate) chain resulting from initiation by a moiety X, will have predominately secondary OH groups at the reactive terminus. Reaction of these OH groups to ligate or initiate a polyether chain will result predominantly (e.g. >60%) in the regiochemistry shown in compound (B). It will be appreciated that this phenomenon is observed also with the use of other epoxide substrates such as butylene oxide, epichlorohydrin, and glycidol derivatives, but not with unsubstituted, or symmetrically substituted epoxides such as ethylene oxide or 2-butene oxide.

In certain embodiments of the present invention, the methods include synthesizing a triblock copolymer by reacting an epoxide and carbon dioxide in the presence of a suitable catalyst and a polyether chain transfer agent having two free OH group as shown in Scheme 3. Compounds of formulae X through X-d described above can be made according to this method.

Scheme 3

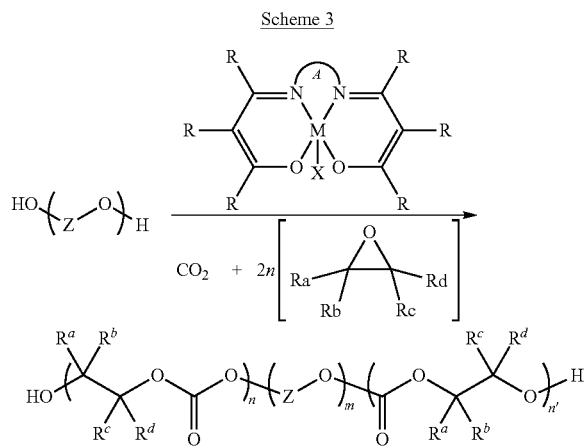

As shown in scheme 4, the products of Scheme 3, can be end-capped as described above for diblock co-polymers.

Scheme 4

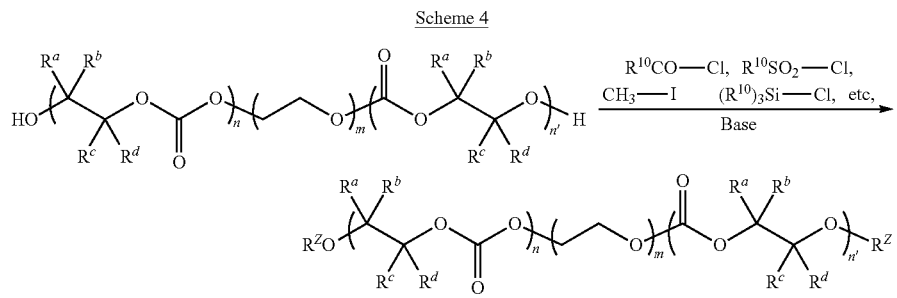

It will be appreciated that these methods can also be applied using other —OH or $CO_2H$ terminated oligomers as chain transfer agents in place of the polyethers depicted above. For example, polyesters, polyacrylates, or propoxylated or ethoxylated derivatives thereof can be used as well.

In some embodiments, the present disclosure encompasses methods of making amphiphilic polymers as described hereinabove comprising the step of synthesizing a polycarbonate chain having one end terminated with an —OH group, followed by ligation to a polyether. Such ligation may be accomplished by forming an ether bond to a preformed polyether molecule or, more preferably, by conducting a second polymerization in the presence of a suitable polyether precursor such as an epoxide or formaldehyde to synthesize the polyether block directly onto the co-polymer. This approach is outlined in Scheme 5.

Scheme 5

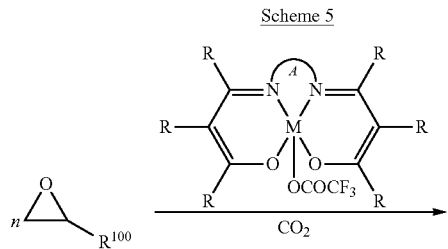

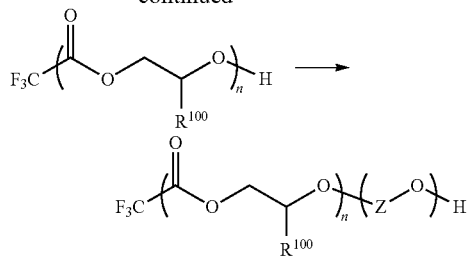

It will be appreciated that this approach leads to compounds having an —OH terminal group on the polyether block and a non-OH group derived from the polycarbonate chain initiator at the polycarbonate terminus of the polymer.

Similarly, triblock co-polymers derived from ether synthesis upon a di-hydroxy terminated polycarbonate are also possible, this process will yield compounds of formula XI-b described hereinabove.

For block co-polymers made by polymerizing a polyether precursor onto a preformed polycarbonate, it should be noted that the resulting compounds may contain a linker between the polycarbonate and the polyether corresponding to a ring-opened molecule of the epoxide from which the polycarbonate was formed. This is shown in structure (C) below for a polycarbonate-co-polyethylene glycol where the linker is denoted "L" and in other similar examples hereinabove.

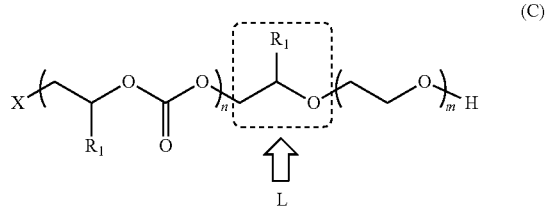

(C)

Of course, in cases where the epoxide subunit of the polycarbonate corresponds to the repeat unit of a polyether block (i.e. poly(ethylene carbonate)-block-poly(ethylene glycol)), such a linker moiety will not be distinguishable and the linker 1' can be regarded as comprising a single covalent bond.

In some embodiments, the present invention encompasses methods for the formation of emulsions between supercritical carbon dioxide and a polar liquid. In certain embodiments, the polar liquid comprises water or an aqueous solution. In certain embodiments, the method includes the step of agitating a biphasic mixture of supercritical $CO_2$ and the polar liquid in the presence of any one or more of the block copolymers described hereinabove. In another embodiment, the method of forming the emulsion comprises forcing a mixture of the two phases and the surfactant through a porous substance.

In certain embodiments, the present invention provides a method of forming an emulsion of supercritical $CO_2$ and an aqueous phase, the method comprising a step of agitating supercritical $CO_2$ and the aqueous phase in the presence of a block copolymer having a formula:

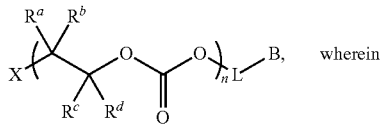

wherein

X is selected from the group consisting of: halogen; —OH; azide, nitrile, and —OR$^z$;

each R$^a$, R$^b$, R$^c$, and R$^d$ is independently selected from the group consisting of: hydrogen, halogen, —CH$_2$OR$^z$, optionally substituted C$_{1-10}$ aliphatic, optionally substituted 6- to 14-membered aromatic, optionally substituted 3- to 14-membered heterocyclic, and optionally substituted 5- to 14-membered heteroaryl, and where any two or more of R$^a$, R$^b$, R$^c$, and R$^d$ may be taken together to form an optionally substituted 3- to 12-membered ring, optionally containing one or more heteroatoms;

L is a bond or a polyfunctional moiety,

B is a hydrophilic oligomer having from about 4 to about 100 repeating units, n is an integer between 4 and 100, R$^z$ is selected from the group consisting of —C(O)R$^{10}$, —SO$_2$R$^{10}$, —Si(R$^{10}$)$_3$, —C(O)N(R$^{10}$)$_2$, optionally substituted C$_{1-12}$ aliphatic; optionally substituted C$_{1-12}$ heteroaliphatic; optionally substituted 6- to 14-membered aryl; and optionally substituted 5- to 14-membered heteroaryl, and R$^{10}$ is an optionally substituted moiety selected from the group consisting of: C$_{1-20}$ aliphatic; C$_{1-12}$ heteroaliphatic; 6- to 14-membered aryl; and 5- to 14-membered heteroaryl.

In certain embodiments, the present invention provides a method of forming an emulsion of supercritical $CO_2$ and an aqueous phase, the method comprising a step of agitating supercritical $CO_2$ and the aqueous phase in the presence of a block copolymer having a formula:

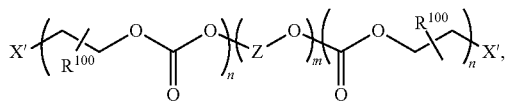

wherein

X' is selected from the group consisting of —OH, and —OR$^z$, R$^{100}$ is optionally present, and if present is selected from the group consisting of —CH$_3$, —CF$_3$, —CH$_2$CH$_3$, —CH$_2$OR$^z$, and —CH$_2$Cl, each n is independently an integer between 4 and 100, —Z— is an optionally substituted C$_{1-6}$ aliphatic group, m is an integer between 5 and 200, R$^z$ is selected from the group consisting of —C(O)R$^{10}$, —SO$_2$R$^{10}$, —Si(R$^{10}$)$_3$, —C(O)N(R$^{10}$)$_2$, optionally substituted C$_{1-12}$ aliphatic; optionally substituted C$_{1-12}$ heteroaliphatic; optionally substituted 6- to 14-membered aryl; and optionally substituted 5- to 14-membered heteroaryl, and R$^{10}$ is at each occurrence an optionally substituted moiety independently selected from the group consisting of: C$_{1-12}$ aliphatic; C$_{1-12}$ heteroaliphatic; 6- to 14-membered aryl; and 5- to 14-membered heteroaryl.

In certain embodiments, provided block co-polymers useful for forming an emulsion are of the formula:

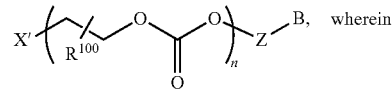

R$^{100}$ is optionally present, and if present is selected from the group consisting of —CH$_3$, —CF$_3$, —CH$_2$CH$_3$, —CH$_2$OR$^z$, —CH$_2$Cl, a C$_{6-30}$ alkyl group, and mixtures of any two or more of these.

In certain embodiments, the block copolymers and methods described hereinabove have utility in modifying the viscosity of supercritical $CO_2$ water mixtures. Such viscosity modifying properties can have utility in the use of supercritical $CO_2$ as a fluid for secondary or tertiary recovery of product from oil wells. Methods of using and means of modeling compounds for such applications are described in published PCT application WO 2000035998 A2 which is incorporated herein by reference and in references cited therein.

In some embodiments, the present invention provides a method of modifying the viscosity of a fluid comprising a mixture of supercritical $CO_2$ and water, the method comprising a step of agitating the mixture in the presence of a block copolymer having a formula:

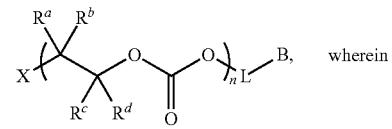

wherein

X is selected from the group consisting of: halogen; —OH; azide, nitrile, and —OR$^z$;

each R$^a$, R$^b$, R$^c$, and R$^d$ is independently selected from the group consisting of: hydrogen, halogen, —CH$_2$OR$^z$, optionally substituted C$_{1-10}$ aliphatic, optionally substituted 6- to 14-membered aromatic, optionally substituted 3- to 14-membered heterocyclic, and optionally substituted 5- to 14-membered heteroaryl, and where any two or more of R$^a$, R$^b$, R$^c$, and R$^d$ may be taken together to form an optionally substituted 3- to 12-membered ring, optionally containing one or more heteroatoms;

L is a bond or a polyfunctional moiety,

B is a hydrophilic oligomer having from about 4 to about 100 repeating units, n is an integer between 4 and 100, R$^z$ is selected from the group consisting of —C(O)R$^{10}$, —SO$_2$R$^{10}$, —Si(R$^{10}$)$_3$, —C(O)N(R$^{10}$)$_2$, optionally substituted C$_{1-12}$ aliphatic; optionally substituted C$_{1-12}$ heteroaliphatic; optionally substituted 6- to 14-membered aryl; and optionally substituted 5- to 14-membered heteroaryl, and R$^{10}$ is an optionally substituted moiety selected from the group consisting of: C$_{1-20}$ aliphatic; C$_{1-12}$ heteroaliphatic; 6- to 14-membered aryl; and 5- to 14-membered heteroaryl.

In certain embodiments, the present invention provides a method of modifying the viscosity of a fluid comprising a mixture of supercritical $CO_2$ and water, the method comprising a step of agitating the mixture in the presence of a block copolymer having a formula:

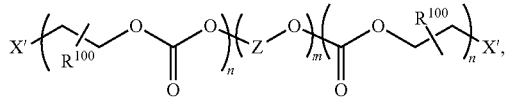

wherein
- X' is selected from the group consisting of —OH, and —OR$^z$
- R$^{100}$ is optionally present, and if present is selected from the group consisting of —CH$_3$, —CF$_3$, —CH$_2$CH$_3$, —CH$_2$OR$^z$, and —CH$_2$Cl;
- each n is independently an integer between 4 and 100,
- —Z— is an optionally substituted C$_{1-6}$ aliphatic group,
- m is an integer between 5 and 200,
- R$^z$ is selected from the group consisting of —C(O)R$^{10}$, —SO$_2$R$^{10}$, —Si(R$^{10}$)$_3$, —C(O)N(R$^{10}$)$_2$, optionally substituted C$_{1-12}$ aliphatic; optionally substituted C$_{1-12}$ heteroaliphatic; optionally substituted 6- to 14-membered aryl; and optionally substituted 5- to 14-membered heteroaryl, and
- R$^{10}$ is at each occurrence an optionally substituted moiety independently selected from the group consisting of: C$_{1-12}$ aliphatic; C$_{1-12}$ heteroaliphatic; 6- to 14-membered aryl; and 5- to 14-membered heteroaryl.

In certain embodiments of the methods described above, a block copolymer is provided as a solution in supercritical $CO_2$.

In certain embodiments, the present invention includes methods of enhancing product recovery from oil wells by introducing any of the above-described polymers to an oil-containing geological formation. In some embodiments, such methods comprise the step of pumping a provided copolymer into an oil well. In certain embodiments, the polymers are introduced in combination with supercritical $CO_2$. In certain methods, the supercritical $CO_2$ is combined with water or brine to form an emulsion capable of flushing trapped oil from geological formations.

EXAMPLES

Example 1

Synthesis of Poly(propylene carbonate)-block-poly(ethylene glycol) methyl ether

1

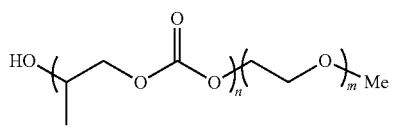

(a compound of formula II-d wherein X' is OH, R$^{100}$ is —CH$_3$, L is a bond, and Z is —CH$_2$CH$_2$— and Y' is CH$_3$ with n being approximately 11 and m being approximately 11)

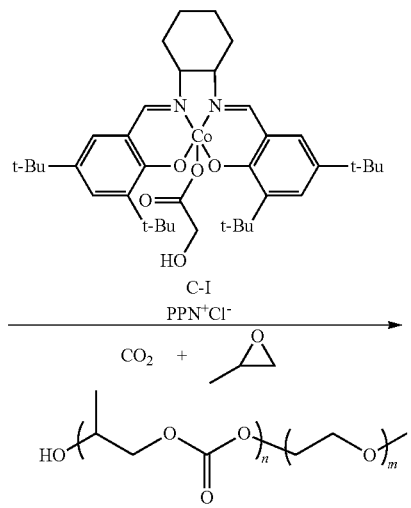

Procedure A:

A 3 oz. Fischer-Porter bottle was fitted with a pressure head and magnetic stirrer. The reaction vessel was dried in vacuo using a heat gun and cooled to rt. catalyst C-I (24 mg, 3.6×10$^{-5}$ mol) and bis(triphenylphosphine)iminium chloride (21 mg, 3.6×10$^{-5}$ mol) were charged to the reaction vessel. The vessel was evacuated for 15 min, then backfilled with nitrogen. This procedure was repeated twice more. While under the positive flow of nitrogen, propylene oxide (20 mL, 0.29 mol) and poly(ethylene glycol) methyl ether (M$_n$=550 g/mol, 2.2 mL, 7.1×10$^{-3}$ mol) were charged to the reaction vessel. The reaction was placed into a 30° C. water bath, stirred, and pressurized with carbon dioxide (100 psi).

After 21.5 h the reaction was vented and quenched with a methanolic solution (3 mL) of tosic acid (14 mg, 7.2×10$^{-5}$ mol). The reaction was stirred for 10 min at rt and the unreacted propylene oxide was removed by evaporation. The resulting polymer was diluted with acetone (10 mL) and filtered through filter paper to remove solids. The filtrate was shaken with Dowex MSC (H) (5.0 g) for 2 h and filtered through a fine mesh. The filtrate was concentrated, in vacuo, to produce 1.0 g (4% yield) of a tan, slightly viscous polymer (M$_w$=1,688 g/mol, M$_w$/M$_n$=1.06; T$_{d(onset)}$=210° C., containing 24% propylene carbonate).

Procedure B:

A 300 mL stainless steel reactor was dried, in vacuo, using a hot plate (120° C.) and cooled to rt. catalyst C-I (60 mg, 8.9×10$^{-5}$ mol) and bis(triphenylphosphine)iminium chloride (51 mg, 8.9×10$^{-5}$ mol) were charged to the reaction vessel. The vessel was evacuated for 15 min, then backfilled with nitrogen. This procedure was repeated twice more.

While under the positive flow of nitrogen, propylene oxide (50 mL, 0.71 mol) and poly(ethylene glycol) monomethylether (M$_n$=550 g/mol, 4.5 mL, 8.9×10$^{-3}$ mol) were charged to the reaction vessel. The reaction was pressurized to 300 psi of carbon dioxide and heated to 30° C. using a heating mantle.

After 16 h the reaction was vented and quenched with a methanolic solution (3 mL) of tosic acid (approx. 34 mg, 1.8×10$^{-4}$ mol). The reaction was stirred for 10 min at rt and the unreacted propylene oxide was removed by evaporation. The resulting polymer samples were diluted with acetone (100 mL) and filtered through filter paper to remove solids. The filtrate was shaken with Dowex MSC (H) (9.0 g) for 2 h and filtered through a fine mesh. The filtrate was concentrated, in vacuo, to produce a total of 11.5 g (16% yield) of a tan viscous polymer (M$_w$=3,057 g/mol, M$_w$/M$_n$=1.06; T$_g$=−34° C.; T$_{d(onset)}$=252° C., 7% propylene carbonate).

Example 2

Synthesis of Poly(propylene carbonate)-block-poly(propylene glycol)monobutyl ether (2)

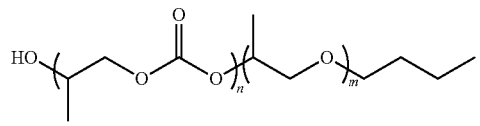

(a compound of formula II-d wherein X' is OH, $R^{100}$ is —$CH_3$, L is a bond, and Z is —$CH(CH_3)CH_2$— and Y' is n-butyl with n being approximately 5 and m being approximately 19)

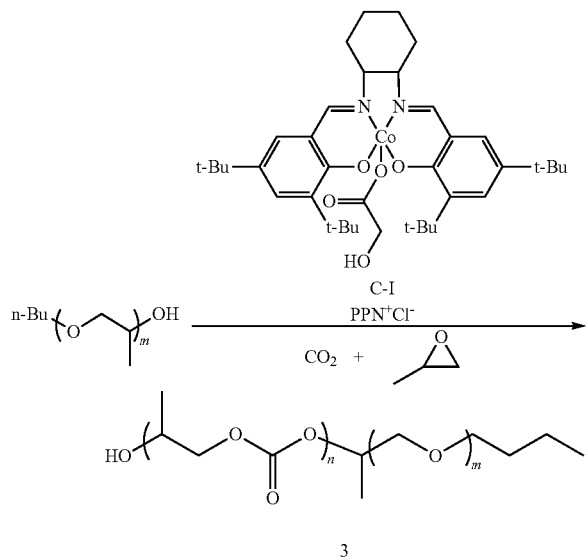

Procedure A for 1 was followed except poly(propylene glycol) monobutyl ether ($M_n$=340 g/mol, 2.4 mL, 7.1×10$^{-3}$ mol) was used as a chain transfer agent. This produced 1.6 g (7% yield) of a yellow viscous polymer ($M_w$=2,258 g/mol, $M_w/M_n$=1.08; $T_g$=−47° C.; $T_{d(onset)}$=229° C., containing 15% propylene carbonate).

Example 3

Synthesis of poly(propylene carbonate)-block-poly(ethylene glycol)-block-poly(propylene carbonate) (3)

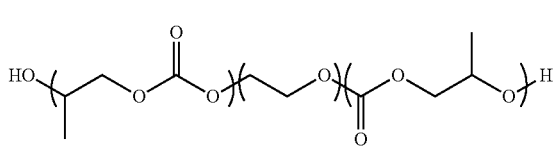

(compounds of formula X-b where $R^{100}$ is methyl).

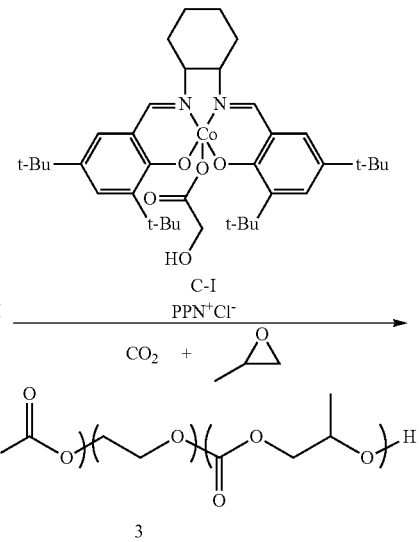

A 300 mL stainless steel reactor was dried, in vacuo, using a hot plate (120° C.) and cooled to rt. Catalyst C-I (182 mg, 2.7×10$^{-4}$ mol) and Bis(triphenylphosphine)iminium chloride (154 mg, 2.7×10$^{-4}$ mol) were charged to the reaction vessel. The vessel was evacuated for 15 min, then backfilled with nitrogen. This procedure was repeated twice more. While under the positive flow of nitrogen, propylene oxide (150 mL, 2.2 mol) and poly(ethylene glycol) ($M_n$=400 g/mol, 9.5 mL, 2.7×10$^{-2}$ mol) were charged to the reaction vessel. The reaction was pressurized to 300 psi of carbon dioxide and heated to 30° C. using a heating mantle.

At 2, 4, 6, and 8 h, 10 mL samples were removed from the reaction and quenched with a methanolic solution (3 mL) of tosic acid (7 mg, 3.9×10$^{-5}$ mol). After 26 h the reaction was vented and quenched with a methanolic solution (3 mL) of tosic acid (54 mg, 3.0×10$^{-4}$ mol). The reaction was stirred for 10 min at rt and the unreacted propylene oxide was removed by evaporation. The resulting polymer samples were diluted with acetone (10 mL) and filtered through filter paper to remove solids. The filtrates were shaken with Dowex MSC (H) (5.0 g) for 2 h and filtered through a fine mesh. Each filtrate was concentrated, in vacuo, to produce a total of 66.0 g (30% yield) of a tan, slightly viscous polymer. 2 h sample ($M_w$=1,134 g/mol, $M_w/M_n$=1.14); 4 h sample ($M_w$=1,543 g/mol, $M_w/M_n$=1.07; $T_g$=−66° C.; $T_{d(onset)}$=257° C.); 6 h sample ($M_w$=2,004 g/mol, $M_w/M_n$=1.06); 8 h sample ($M_w$=2,422 g/mol, $M_w/M_n$=1.04; $T_g$=−49° C.; $T_{d(onset)}$=248° C., 6% propylene carbonate); 26 h sample ($M_w$=5,423 g/mol, $M_w/M_n$=1.02).

Example 4

Synthesis of polypropylene carbonate)-acetate-block-poly(ethylene glycol) (4)

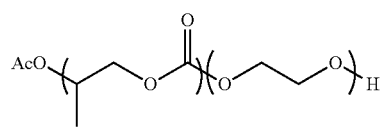

(a compound of formula II-c wherein X' is -OAc, $R^{100}$ is —$CH_3$, L is a bond, and Z is —$CH_2CH_2$— and Y' is —H)

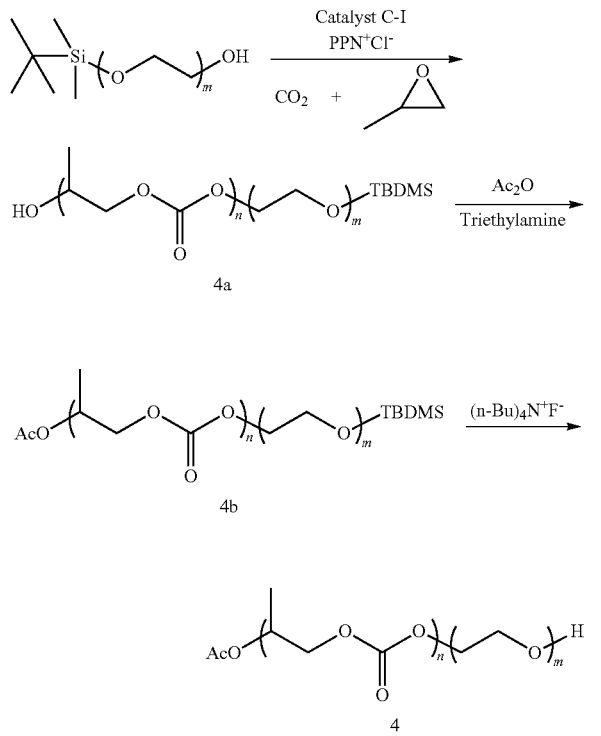

4a

4b

4

A 3 oz. Fischer-Porter bottle is fitted with a pressure head and magnetic stirrer. The reaction vessel is dried in vacuo using a heat gun and cooled to rt. Catalyst C-I (24 mg, 3.6× $10^{-5}$ mol) and bis(triphenylphosphine)iminium chloride (21 mg, 3.6×$10^{-5}$ mol) are charged to the reaction vessel. The vessel is evacuated for 15 min, then backfilled with nitrogen. While under a positive flow of nitrogen, propylene oxide (20 mL, 0.29 mol) and poly(ethylene glycol) mono t-butyldimethylsilyl ether (7.1×$10^{-3}$ mol prepared as described in *Journal of Organic Chemistry* (1991), 56(13), 4326-4329) are charged to the reaction vessel. The reaction is placed into a 30° C. water bath, stirred, and pressurized with carbon dioxide (100 psi).

After 24 h the reaction is vented and quenched with a methanolic solution (3 mL) of tosic acid (14 mg, 7.2×$10^{-5}$ mol). The mixture is stirred for 10 min at rt and the unreacted propylene oxide is removed by evaporation. The resulting polymer is diluted with acetone (10 mL) and filtered through filter paper to remove solids. The filtrate is shaken with Dowex MSC (H) (5.0 g) for 2 h and filtered through a fine mesh. The filtrate is concentrated, in vacuo, to produce polymer 4a. This polymer is dissolved in dichloromethane (10 mL) containing triethyl amine (1 mL) and treated with acetic anhydride (0.5 mL). The mixture is heated to reflux for 16 h, then cooled to rt, diluted with dichloromethane (40 mL) and washed with water and then brine. The dichloromethane solution is dried on anhydrous $K_2CO_3$ and concentrated to give compound 4b. Polymer 4b is dissolved in THF (20 mL) in a PTFE container and tetrabutylammonium fluoride (0.2 g) is added. The mixture is stirred for 1 h, then poured into water and extracted with dichloromethane (5×20 mL). The combined dichloromethane extracts are dried on $K_2CO_3$, filtered and concentrated to afford polymer 4.

Example 5

Synthesis of Poly(propylene carbonate)-pivalate-block-poly(propylene glycol) (5)

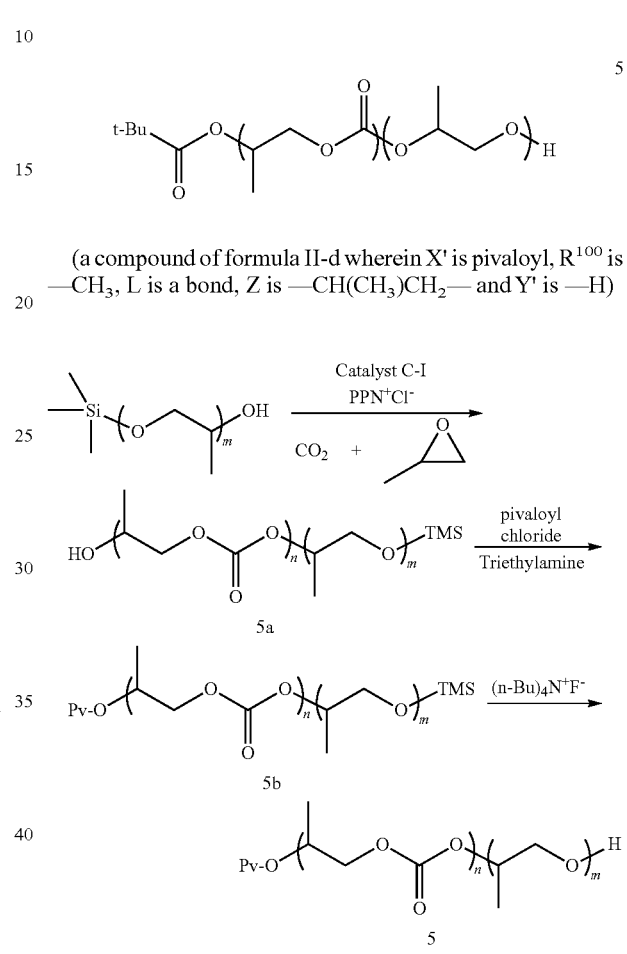

5

(a compound of formula II-d wherein X' is pivaloyl, $R^{100}$ is —$CH_3$, L is a bond, Z is —$CH(CH_3)CH_2$— and Y' is —H)

5a

5b

5

Compound 5 is synthesized under conditions similar to those described in Example 4, except mono-TMS-protected polypropylene glycol is used as the starting material, and pivaloyl chloride is substituted for acetic anhydride.

Example 7

Synthesis of polypropylene carbonate)-acetate-block-poly(ethylene glycol) (7)

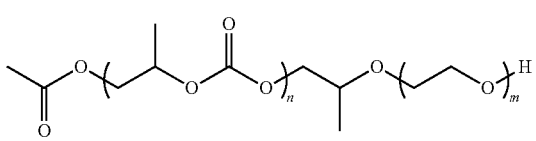

7

(a compound of formula II-c wherein X is —OAc, $R^{100}$ is —$CH_3$, L is —$CH_2CH(CH_3)O$—, and Z is —$CH_2CH_2$—)

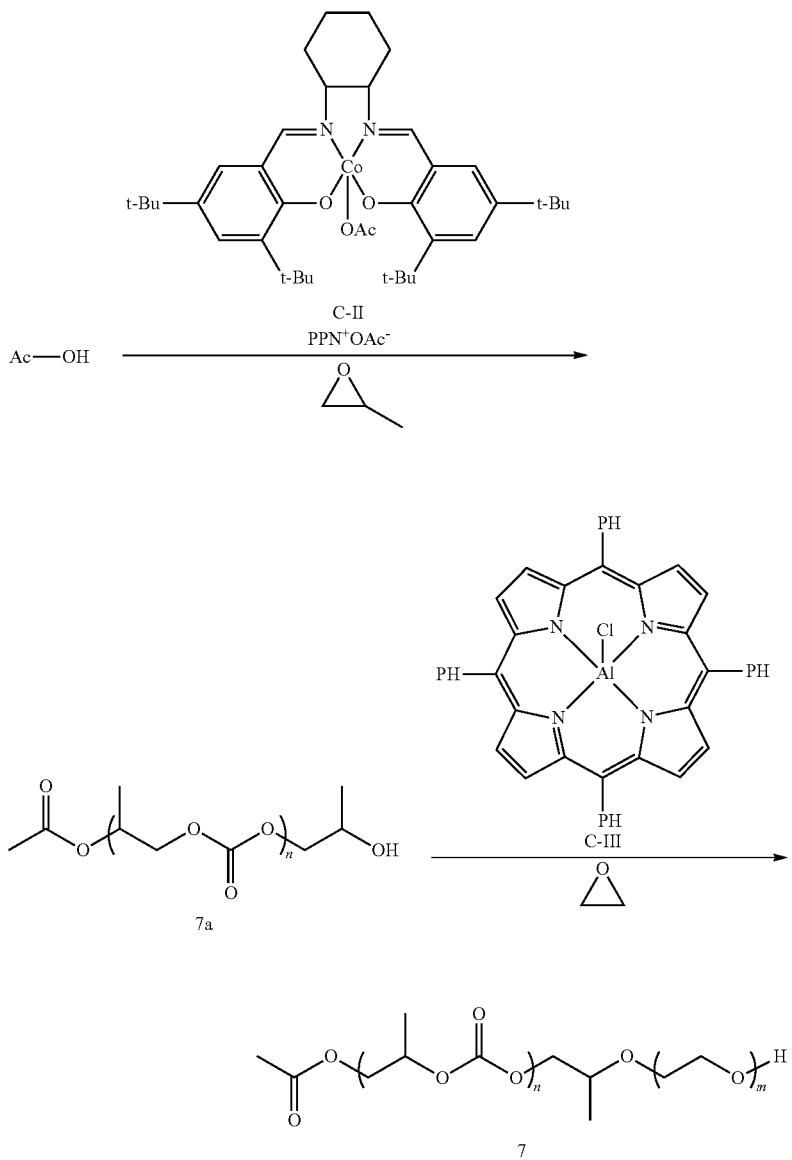

In a glovebox, catalyst C-II (5.4 mg) and PPN-acetate (4.8 mg) are charged to an oven-dried 20 mL glass liner. The liner is inserted into a stainless steel high pressure reactor. The system is purged with $N_2$ five times and purged with $CO_2$ twice. While under the positive flow of $CO_2$, propylene oxide (5 mL) and acetic acid (200 μL) are charged to the reaction vessel. The reaction is heated to 50° C., then pressurized with carbon dioxide (300 psi) and stirred. After 6 h the reaction is vented and quenched with acidic methanol (0.2 mL). The reaction is cooled to room temperature, and the resulting polymer is diluted with acetone (5 mL) and transferred to a foil pan. The unreacted propylene oxide and acetone are removed by evaporation to produce polymer 7a as an oil.

In a dry 100 ml flask, 1 g of polymer 7a is dissolved in 15 mL of dichloromethane. To this mixture is added 2 g of ethylene oxide followed by 150 mg of catalyst C-III dissolved in 5 mL of dichloromethane. This mixture is stirred at rt for 48 h, then quenched by addition of a large excess of methanol. The volatile components are then removed under vacuum, the residue is dissolved in THF (100 mL) and filtered through a 0.22 μm filter. Evaporation of the filtrate provides polymer 7 as a viscous oil.

Example 8

Synthesis of isopropyl ether capped poly(propylene carbonate)-block-poly(propylene glycol) (8)

(a compound of formula II-c wherein X is —O-i-Pr, $R^{100}$ is —$CH_3$, L is a bond, and Z is —$CH_2CH(CH_3)$—)

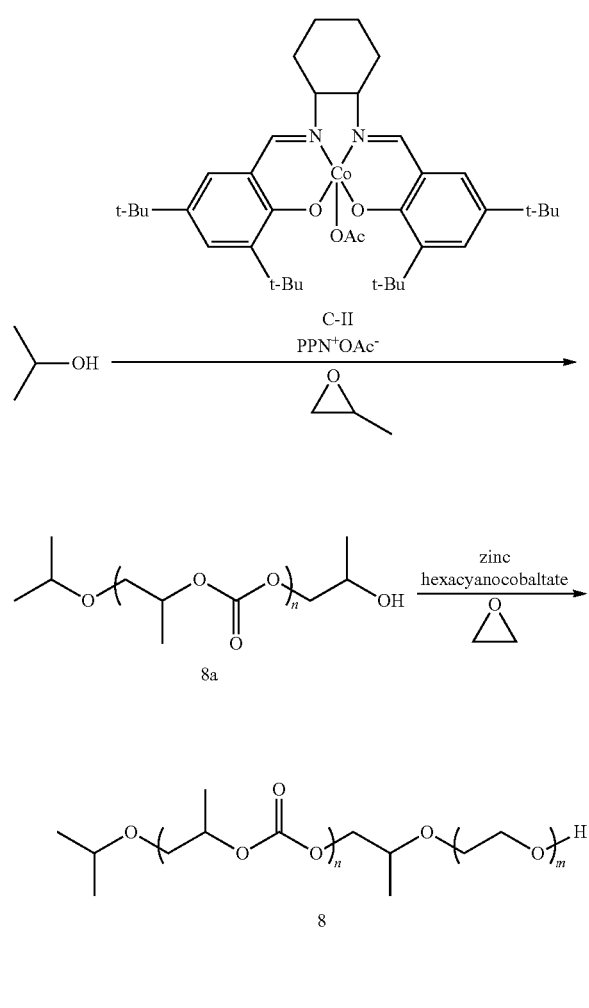

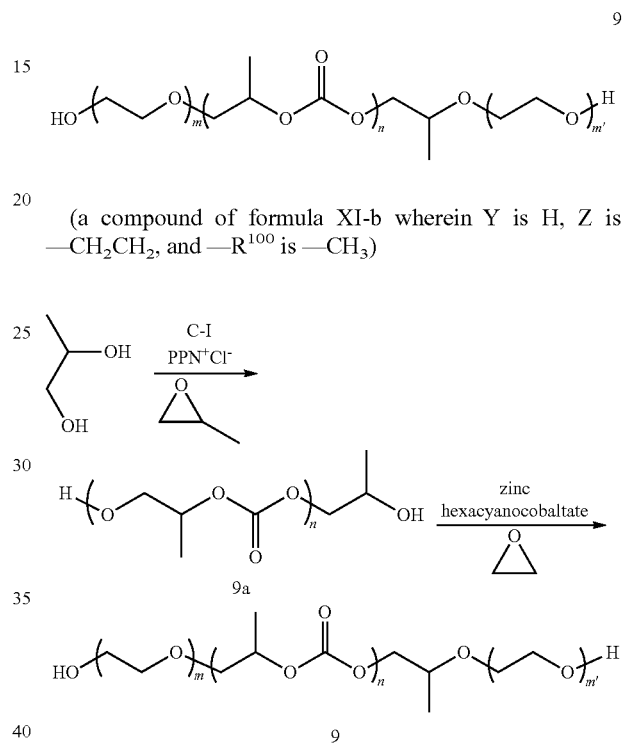

acted monomer is then stripped under vacuum from the product, and the residue is cooled and recovered to provide polymer 8 as a viscous oil.

Example 9

Synthesis of block-poly(ethylene glycol)-block polypropylene carbonate)-block-poly(ethylene glycol) (9)

(a compound of formula XI-b wherein Y is H, Z is —$CH_2CH_2$—, and —$R^{100}$ is —$CH_3$)

In a glovebox, catalyst C-II (50 mg) and PPN-chloride (48 mg) are charged to an oven-dried 200 mL high pressure reactor. The reactor is purged with $N_2$ five times and purged with $CO_2$ twice. While under the positive flow of $CO_2$, propylene oxide (70 mL) and isopropyl alcohol (0.5 mL) are charged to the reaction vessel. The reaction is heated to 35° C., then pressurized with carbon dioxide (300 psi) and stirred. After 6 h the reaction is vented and quenched with acidic methanol (5 mL). The reaction is cooled to room temperature, and the resulting polymer is diluted with acetone (50 mL) and transferred to a pan. The unreacted propylene oxide and acetone are removed by evaporation to provide polymer 8a as a viscous oil.

A 100 mL reactor is charged with polymer 8a (10 g) and zinc hexacyanocobaltate catalyst (0.02 g). The mixture is stirred and heated to 105° C., and is stripped under vacuum to remove traces of water from polymer 8a. Ethylene oxide (2-3 g) is added in one portion. The reactor pressure is then monitored carefully. Additional ethylene oxide is not added until an accelerated pressure drop occurs in the reactor indicating that the catalyst has become activated. When catalyst activation is verified, the remaining ethylene oxide (20 g) is added gradually to keep the reactor pressure at about 10 psig. After ethylene oxide addition is complete, the mixture is held at 105° C. until a constant pressure is observed. Residual unre- In a glovebox, catalyst C-I (5.4 mg) and PPN-chloride (4.8 mg) are charged to an oven-dried 20 mL glass liner. The liner is inserted into a stainless steel high pressure reactor. The system is purged with $N_2$ five times and purged with $CO_2$ twice. While under the positive flow of $CO_2$, propylene oxide (5 mL) and propylene glycol (200 µL) are charged to the reaction vessel. The reaction is heated to 35° C., then pressurized with carbon dioxide (300 psi) and stirred. After 6 h the reaction is vented and quenched with acidic methanol (0.2 mL). The reaction is cooled to room temperature, and the resulting polymer is diluted with acetone (5 mL) and transferred to a foil pan. The unreacted propylene oxide and acetone are removed by evaporation to produce polymer 9a as a viscous oil.

In a dry flask, 1 g of polymer 9a and 5 mg of zinc hexacyanocobaltate catalyst are combined. To this mixture is added 2 g of ethylene oxide. This mixture is stirred at rt for 48 h, then heated to 105° C. for 1 h. Residual unreacted monomer is then stripped under vacuum from the product, and the residue is cooled and recovered to provide polymer 9 as a viscous oil.

Supercritical Carbon Dioxide Solubility Tests:

Samples were evaluated for supercritical $CO_2$ (sc-$CO_2$) solubility at a range of pressures and concentrations using the apparatus and conditions described in the *Journal of Super-* critical Fluids 34 (2005), pp. 11-16, and Journal of Physical Chemistry 100 (1996) which are incorporated herein by reference.

The solubility of the polymers of Examples 1-3 and related compounds in supercritical CO₂ and various concentrations, temperatures, and pressures are shown in FIGS. 1-4.

Emulsion Tests:

Samples were evaluated for the ability to stabilize foams between supercritical CO₂ (sc-CO₂) and water. Foam test conditions used a windowed cell containing equal volumes of liquid sc-CO₂ and brine or water. The mixtures were agitated in the presence of 0.1 wt % surfactant (based on mass of CO₂) and the stability of the foam was observed visually by periodically measuring the height of foam present in the CO₂ phase and the depth of foam present in the aqueous phase. Plots of these data for the polymer compositions of examples 1-3 and related materials are shown in FIGS. 4 and 5.

Further detail on suitable experimental conditions for these measurements are found in *Fluid Phase Equilibria* (2003), 211(2), pp 211-217 and in *Chemistry of Materials* (2002), 14(10), pp 4273-4280 which are both incorporated herein by reference.

OTHER EMBODIMENTS

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for the synthesis of a block copolymer having a formula:

$$X'\left[\begin{array}{c}R^a\ R^b\\ \diagup\\ R^c\ R^d\end{array}O\underset{O}{\overset{O}{C}}O\right]_n\left[Z-O\right]_m Y,$$

the method comprising the step of reacting an epoxide of formula $$\overset{O}{\underset{R^a\ R^b}{\diagup\diagdown}}\overset{R^d}{\underset{R^c}{}}$$

with carbon dioxide in the presence of a suitable catalyst and a polyether chain transfer agent having one free OH group;

where X' is selected from the group consisting of —OH and —OR$^z$;

each R$^a$, R$^b$, R$^c$, and R$^d$ is independently selected from the group consisting of hydrogen, halogen, —CH₂OR$^z$, optionally substituted C$_{1-10}$ aliphatic, optionally substituted 6- to 14-membered aromatic, optionally substituted 3- to 14-membered heterocyclic, and optionally substituted 5- to 14-membered heteroaryl, and where any two or more of R$^a$, R$^b$, R$^c$, and R$^d$ may be taken together to form an optionally substituted 3- to 12-membered ring, optionally containing one or more heteroatoms;

R$^z$ is selected from the group consisting of R$^{10}$, —C(O)R$^{10}$, —SO₂R$^{10}$, —Si(R$^{10}$)₃, —C(O)N(R$^{10}$)₂, or a hydroxyl protecting group;

R$^{10}$ is an optionally substituted moiety selected from the group consisting of C$_{1-20}$ aliphatic; C$_{1-12}$ heteroaliphatic; 6- to 14-membered aryl; and 5- to 14-membered heteroaryl;

—Z— is an optionally substituted C$_{1-6}$ aliphatic group;

—Y is selected from the group consisting of —H and R$^z$;

n is an integer between 4 and 100; and m is an integer between 5 and 200.

2. The method of claim 1, wherein the block copolymer has the formula:

$$X'\left[\begin{array}{c}\diagup\\ R^{100}\end{array}O\underset{O}{\overset{O}{C}}O\right]_n L\left[Z-O\right]_m Y,$$

wherein L is a bond or a polyfunctional moiety;
and the epoxide has the formula:

$$\overset{O}{\underset{R^{100}}{\diagup\diagdown}},$$

wherein R$^{100}$ is optionally present and if present is selected from the group consisting of —CH₃, —CF₃, —CH₂CH₃, —CH₂OR$^z$, and —CH₂Cl.

3. The method of claim 2, wherein R$^{100}$ is absent.

4. The method of claim 2, wherein R$^{100}$ is present.

5. The method of claim 4, wherein the block copolymer has the formula:

$$X'\left[\begin{array}{c}R^{100}\\ \diagup\\ \end{array}O\underset{O}{\overset{O}{C}}O\right]_n L\left[Z-O\right]_m Y.$$

6. The method of claim 4, wherein R$^{100}$ is a methyl group.

7. The method of claim 4, wherein R$^{100}$ is a random mixture of methyl groups and one or more moieties selected from group consisting of ethyl, trifluoromethyl, chloromethyl, —CH₂OR$^z$, and a C$_{6-30}$ alkyl group.

8. The method of claim 1, wherein X' is —OH.

9. The method of claim 1, wherein X' is —OR$^z$.

10. The method of claim 9, wherein a block copolymer formed by the step of reacting the epoxide with carbon dioxide and a polyether chain transfer agent is further modified by a reaction to convert —X' from an —OH group to an —OR$^z$ group.

11. The method of claim 10, wherein the block copolymer is modified by a reaction chosen from the group consisting of alkylation, acylation, sulfonation, or silylation.

12. The method of claim 1, wherein —Z— is —CH₂CH₂—.

13. The method of claim 1, wherein —Z— is —CH(CH₃)CH₂—.

14. The method of claim 1, wherein —Z— is —CH$_2$—.

15. The method of claim 1, wherein —Y is —H.

16. The method of claim 1, wherein —Y is a C$_{1-6}$ aliphatic group.

17. The method of claim 1, wherein —Y is a hydroxyl protecting group.

18. The method of claim 17, further comprising the step of treating the block copolymer to convert the hydroxyl protecting group to a free hydroxyl group.

19. The method of claim 18, wherein the hydroxyl protecting group is selected from the group consisting of an allyl ether and benzyl ether.

20. The method of claim 19, wherein the step of converting the hydroxyl protecting group to a free hydroxyl group comprises hydrogenolysis.

21. The method of claim 18, wherein the hydroxyl protecting group comprises a silyl ether.

22. A method for the synthesis of a block copolymer having a formula:

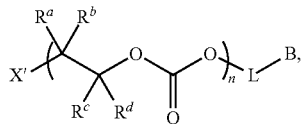

the method comprising the step of reacting an epoxide of formula

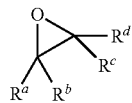

with carbon dioxide in the presence of a suitable catalyst and a chain transfer agent having a formula:

B-L-OH where X' is selected from the group consisting of —OH and —OR$^z$;

each R$^a$, R$^b$, R$^c$, and R$^d$ is independently selected from the group consisting of hydrogen, halogen, —CH$_2$OR$^z$, optionally substituted C$_{1-10}$ aliphatic, optionally substituted 6- to 14-membered aromatic, optionally substituted 3- to 14-membered heterocyclic, and optionally substituted 5- to 14-membered heteroaryl, and where any two or more of R$^a$, R$^b$, R$^c$, and R$^d$ may be taken together to form an optionally substituted 3- to 12-membered ring, optionally containing one or more heteroatoms;

L is a bond or a polyfunctional moiety;

B is a hydrophilic oligomer having from about 4 to about 100 repeating units;

n is an integer between 4 and 100;

R$^z$ is selected from the group consisting of R$^{10}$, —C(O)R$^{10}$, —SO$_2$R$^{10}$, —Si(R$^{10}$)$_3$, —C(O)N(R$^{10}$)$_2$, or a hydroxyl protecting group; and R$^{10}$ is an optionally substituted moiety selected from the group consisting of C$_{1-20}$ aliphatic; C$_{1-12}$ heteroaliphatic; 6- to 14-membered aryl; and 5- to 14-membered heteroaryl.

23. The method of claim 22, wherein -B is selected from the group consisting of polyethers, polyolefin bearing hydrophilic functional groups, polypeptides, polysaccharides and polyamines.

24. The method of claim 23, wherein -B is selected from the group consisting of polyoxymethylene, poly(ethylene oxide), poly(propylene oxide), polyvinyl alcohol, poly(vinyl acetate), partially hydrolyzed poly(vinyl acetate), poly(acrylic acid), polyacrylamide, polyethyleneimine, poly(2-hydroxyethyl methacrylate), poly(N-vinylpyrrolidone), polypeptides, polysaccharides, polyepoxysuccinic acid, poly(methyl vinyl ether), poly(allylamine), poly(2-ethyl-2-oxazoline), and block, tapered or random copolymers of any two or more of the above.

25. The method of claim 23, wherein -B is a polyether.

* * * * *